US006938249B2

(12) United States Patent
Roediger et al.

(10) Patent No.: US 6,938,249 B2
(45) Date of Patent: Aug. 30, 2005

(54) COMPILER APPARATUS AND METHOD FOR OPTIMIZING LOOPS IN A COMPUTER PROGRAM

(75) Inventors: Robert Ralph Roediger, Rochester, MN (US); William Jon Schmidt, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 09/992,324

(22) Filed: Nov. 19, 2001

(65) Prior Publication Data

US 2003/0097652 A1 May 22, 2003

(51) Int. Cl.[7] ............................................. G06F 9/45
(52) U.S. Cl. ...................... 717/160; 717/151; 717/158
(58) Field of Search .............................. 717/150, 151, 717/158–162

(56) References Cited

U.S. PATENT DOCUMENTS

| | | | | |
|---|---|---|---|---|
| 5,768,592 A | * | 6/1998 | Chang | 438/758 |
| 5,950,003 A | * | 9/1999 | Kaneshiro et al. | 717/130 |
| 6,006,033 A | * | 12/1999 | Heisch | 717/158 |
| 6,026,234 A | * | 2/2000 | Hanson et al. | 717/133 |
| 6,029,004 A | * | 2/2000 | Bortnikov et al. | 717/158 |
| 6,253,373 B1 | * | 6/2001 | Peri | 717/150 |
| 6,292,934 B1 | * | 9/2001 | Davidson et al. | 717/158 |
| 6,308,324 B1 | * | 10/2001 | Roediger et al. | 717/158 |
| 6,327,699 B1 | * | 12/2001 | Larus et al. | 717/128 |
| 6,327,704 B1 | * | 12/2001 | Mattson et al. | 717/153 |
| 6,332,214 B1 | * | 12/2001 | Wu | 717/141 |
| 6,631,518 B1 | * | 10/2003 | Bortnikov et al. | 717/158 |
| 6,662,358 B1 | * | 12/2003 | Berry et al. | 717/128 |
| 6,728,955 B1 | * | 4/2004 | Berry et al. | 717/158 |
| 6,751,789 B1 | * | 6/2004 | Berry et al. | 717/130 |

OTHER PUBLICATIONS

Tallman, "Extended path profiling across loop backedges and procedure boundaries", IEEE, Proc. of the International Symp. on CGO, pp 1–12, Sep. 2004.*

Mcfarling, "Reality based optimization", IEEE, pp 59–68, 2003.*

Hall, "Call path profiling", ACM pp 296–306, 1992.*

Cai et al, "Optimal and efficient speculation based partial redundancy elimination", IEEE, pp 91–102, 2003.*

Krintz, "Coupling on line and off line profile information to improve program performance", IEEE, pp 69–78, 2003.*

Chen et al, "Dynamic trace selection using performance monitoring hardware sampling", IEEE, pp 79–90, 2003.*

Joshi et al, "Targeted path profiling: lower overhead path profiling for staged dynamic optimization systems", IEEE, Proc. of the International Symp. CGO, pp 1–12, Sep. 2004.*

* cited by examiner

*Primary Examiner*—Anil Khatri
(74) *Attorney, Agent, or Firm*—Martin & Associates, LLC; Derek P. Martin

(57) ABSTRACT

A profile-based loop optimizer generates an execution frequency table for each loop that gives more detailed profile data that allows making a more intelligent decision regarding if and how to optimize each loop in the computer program. The execution frequency table contains entries that correlate a number of times a loop is executed each time the loop is entered with a count of the occurrences of each number during the execution of an instrumented instruction stream. The execution frequency table is used to determine whether there is one dominant mode that appears in the profile data, and if so, optimizes the loop according to the dominant mode. The optimizer may perform optimizations by peeling a loop, by unrolling a loop, and by performing both peeling and unrolling on a loop according to the profile data in the execution frequency table for the loop. In this manner the execution time of the resulting code is minimized according to the detailed profile data in the execution frequency tables, resulting in a computer program with loops that are more fully optimized.

53 Claims, 15 Drawing Sheets

```
float sumOrders(OrderRec orders[ ], int count, float price) {    310
    float sum = 0.0;                                              320
    for (i=0; i<count; i++) {                                     330
        sum += orders[i].qty * price;                             340
    }
    return sum;                                                   350
}
```

| Execution Count | Frequency |
|---|---|
| 1 | 10 |
| 2 | 800 |
| 3 | 60 |
| 4 | 30 |
| 5 or more | 100 |

| Execution Count | Frequency |
|---|---|
| 1 | 446 |
| 2 | 450 |
| 3 | 3 |
| 4 | 1 |
| 5 or more | 100 |

| Execution Count | Frequency |
|---|---|
| 1 | 40 |
| 2 | 20 |
| 3 | 760 |
| 4 | 80 |
| 5 or more | 100 |

| Execution Count | Frequency |
|---|---|
| 1 | 70 |
| 2 | 400 |
| 3 | 50 |
| 4 | 80 |
| 5 or more | 400 |

COMPILER APPARATUS AND METHOD FOR OPTIMIZING LOOPS IN A COMPUTER PROGRAM

BACKGROUND OF THE INVENTION

1. Technical Field

This invention generally relates to computer systems, and more specifically relates to compilers that generate executable code for computer systems.

2. Background Art

Since the dawn of the computer age, computer systems have evolved into extremely sophisticated devices, and computer systems may be found in many different settings. Dramatic advances in both hardware and software (e.g., computer programs) have drastically improved the performance of computer systems. Modern software has become very complex when compared to early computer programs. Many modern computer programs have tens or hundreds of thousands of instructions. The execution time (and hence, performance) of a computer program is very closely related to the number of instructions that are executed as the computer program runs. Thus, as the size and complexity of computer programs increase, the execution time of the computer program increases as well.

Unlike early computer programs, modern computer programs are typically written in a high-level language that is easy to understand by a human programmer. Special software tools known as compilers take the human-readable form of a computer program, known as "source code", and convert it into "machine code" or "object code" instructions that may be executed by a computer system. Because a compiler generates the stream of machine code instructions that are eventually executed on a computer system, the manner in which the compiler converts the source code to object code affects the execution time of the computer program.

The execution time of a computer program, especially complex computer programs, is a function of the arrangement and type of instructions within the computer program. Loops affect the execution time of a computer program. If a computer program contains many loops, or contains any loops that are executed a relatively large number of times, the time spent executing loops will significantly impact the execution time of a computer program.

In order to optimize the performance of modern computer programs, profilers have been developed to predict and/or measure the run-time performance of a computer program. Profilers typically generate profile data that estimates how often different portions of the computer program are executed. Using profile data, an optimizer (such as an optimizing compiler) may make decisions to optimize loops in a computer program in order to improve the execution speed of the computer program.

Known methods for using profile data to optimize loops in a computer program do not provide an optimal solution. The prior art loop optimization decisions are typically made from an estimate of the average number of times a loop is executed for each time the loop is entered. However, the average number of times a loop is executed for each time the loop is entered may give an inaccurate picture of what is really going on in the code. As a result, the prior art may yield inefficiencies in loops that result in a slower execution time for the computer program. Without improved apparatus and methods for optimizing loops in a computer program, a compiler will generate a computer program that is not as fully optimized as it might be.

DISCLOSURE OF INVENTION

According to the preferred embodiments, a profile-based loop optimizer generates an execution frequency table for each loop that gives more detailed profile data that allows making a more intelligent decision regarding if and how to optimize each loop in the computer program. The execution frequency table contains entries that correlate a number of times a loop is executed each time the loop is entered with a count of the occurrences of each number during the execution of an instrumented instruction stream. The execution frequency table is used to determine whether there is one dominant mode that appears in the profile data, and if so, optimizes the loop according to the dominant mode. The optimizer may perform optimizations by peeling a loop, by unrolling a loop, and by performing both peeling and unrolling on a loop according to the profile data in the execution frequency table for the loop. In this manner the execution time of the resulting code is minimized according to the detailed profile data in the execution frequency tables, resulting in a computer program with loops that are more fully optimized.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION 1.0 Overview

The present invention relates to optimizing loops in a computer program. For those not familiar with compilers or known loop optimization methods, this Overview section will provide background information that will help to understand the present invention.

Known Compilers

Figure 1:
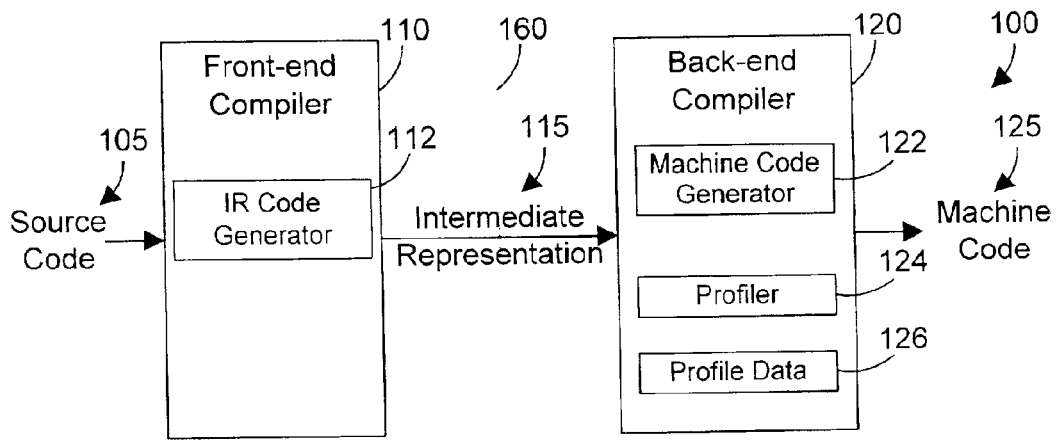
FIG. 1 is a block diagram of a prior art compiler system.

FIG. 1 illustrates a prior art compiling system 100 that includes a front-end compiler 110 and a back-end compiler 120. For most known compilers, there is an architected division (indicated by dotted line 160) between the front-end compiler 110 and the back-end compiler 120. Front-end compilers 110 are used to convert source code 105 to an intermediate representation 115. Back-end compilers 120 are used to convert the intermediate representation 115 to machine code 125 for a particular hardware configuration (i.e., platform). This designed division between front-end compilers and back-end compilers is efficient, because it allows front-end compilers for a number of different languages (e.g., C++, Java, Ada, etc.) to be used with a single back-end compiler for a given platform (e.g., IBM iSeries). Likewise, a single front-end compiler for the Java programming language can be used with multiple back-end compilers if the code needs to be compiled to run on different platforms.

Front-end compiler 110 includes an IR code generator 112 that processes the source code 105 and generates instructions in intermediate representation 115. Back-end compiler 120 includes a machine code generator 122 that processes the intermediate representation 115 and generates machine code 125 that is executable on a particular platform. Back-end compiler 120 also includes a profiler 124 that is used to obtain profile data 126 when the machine code 125 is run with a set of sample inputs. As used herein, the term "sample inputs" means inputs that simulate real-world execution of the machine code in its intended environment. Machine code generator 122 includes the capability of using profile data 126 to optimize the machine code 125 by processing the intermediate representation code 115 a second time according to the profile data 126.

Profile-based Loop Optimizations in Known Compilers

Figure 2:
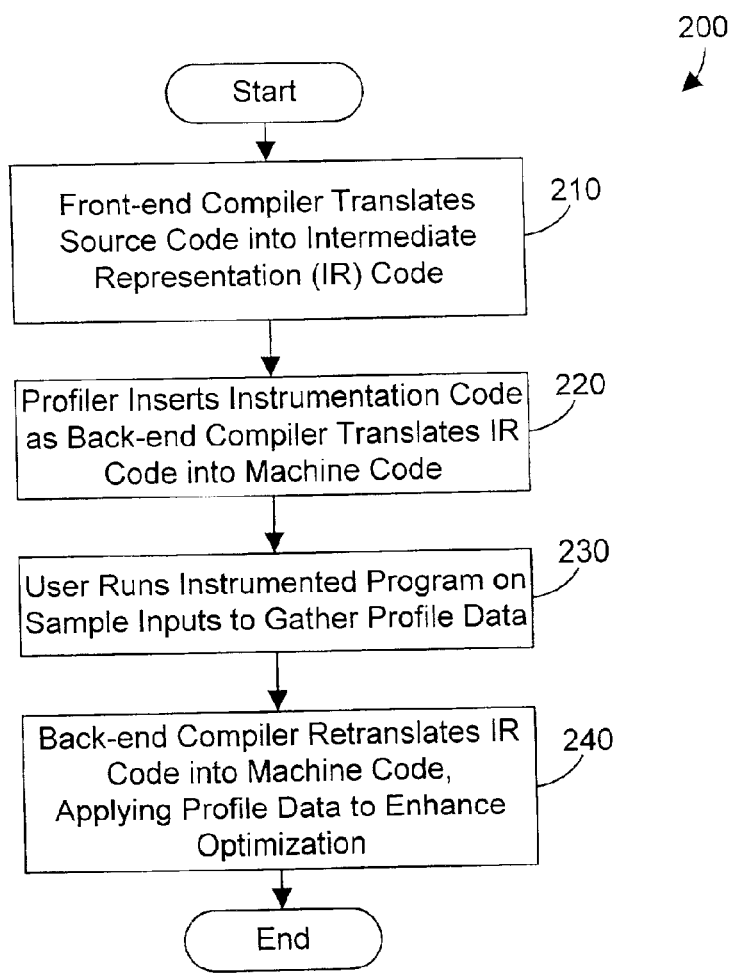
FIG. 2 is a flow diagram showing steps in a prior art method for compiling source code using the compiler system of FIG. 1.

FIG. 2 is a flow diagram of a method 200 for compiling source code using the prior art compiling system 100 in FIG. 1. First, the front-end compiler translates the source code into intermediate representation (IR) code (step 210). Next, the back-end compiler processes the intermediate representation, inserting instrumentation code into the machine code (step 220). Instrumentation code is code that typically increments counters to keep track of how many times each branch in the machine code 125 is taken versus not taken when the machine code 125 is executed with a sample set of inputs that are designed to simulate the real-world environment for executing the machine code 125. Once the instrumentation code is inserted into the machine code 125, the instrumented program (i.e., machine code) is run using sample inputs, and profile data regarding the execution is gathered (step 230). For the case of instrumented code, the profile data consists of count values for each branch in the machine code that indicate the number of times the branch was taken versus not taken. The back-end compiler then retranslates the IR code into machine code, applying the profile data to enhance optimization of the computer program (step 240). Note from FIGS. 1 and 2 that profile-based optimizations are typically done in the back-end compiler. However, profile-based optimizations may also be performed by a link-time optimizer as well, or could be performed on-the-fly while a program is running.

Method 200 of FIG. 2 assumes in step 220 that the profiler inserts instrumentation code into the machine code. Note, however, that profiling may also occur via sampling, which uses a time-based interrupt in the operating system to periodically halt program execution and determine the current address. Sampling does not require the insertion of instrumentation code, and is another known way to collect profile data. In general sampling is less intrusive than inserting instrumentation code, but it is also correspondingly less accurate. Sampling is limited to identifying which blocks of code are frequently executed, but does not generally indicate which branches were taken to get to the frequently-executed blocks.

There are many ways known in the art to acquire profile data and to use the profile data to optimize code. For a general discussion of one specific way to optimize code using profile data, see Schmidt et al., "Profile-Directed Restructuring of Operating System Code", IBM Systems Journal, vol. 37 no. 2, p. 270–297 (1998).

Two known ways to optimize loops in the prior art according to collected profile data are referred to as "peeling" and "unrolling". Loop peeling is a technique used on loops expected to iterate only a few times each time they are entered. The loop body is replaced by N copies of itself, where N is the number of expected iterations. The original loop is copied to the end of the program and targeted from the last peeled iteration, in case overflow iterations are needed. The peeled iterations can then be optimized as though they were outside the loop, increasing the scope of many optimizations.

Loop unrolling is a technique used on loops that are expected to iterate many times each time they are entered. Again the loop body is replaced by N copies of itself, where N is an unroll factor determined heuristically. The last iteration is changed to target the first iteration, however, so the N copies together form an expanded loop. The unrolled iterations can be optimized together within the loop.

Figures 3, 4:
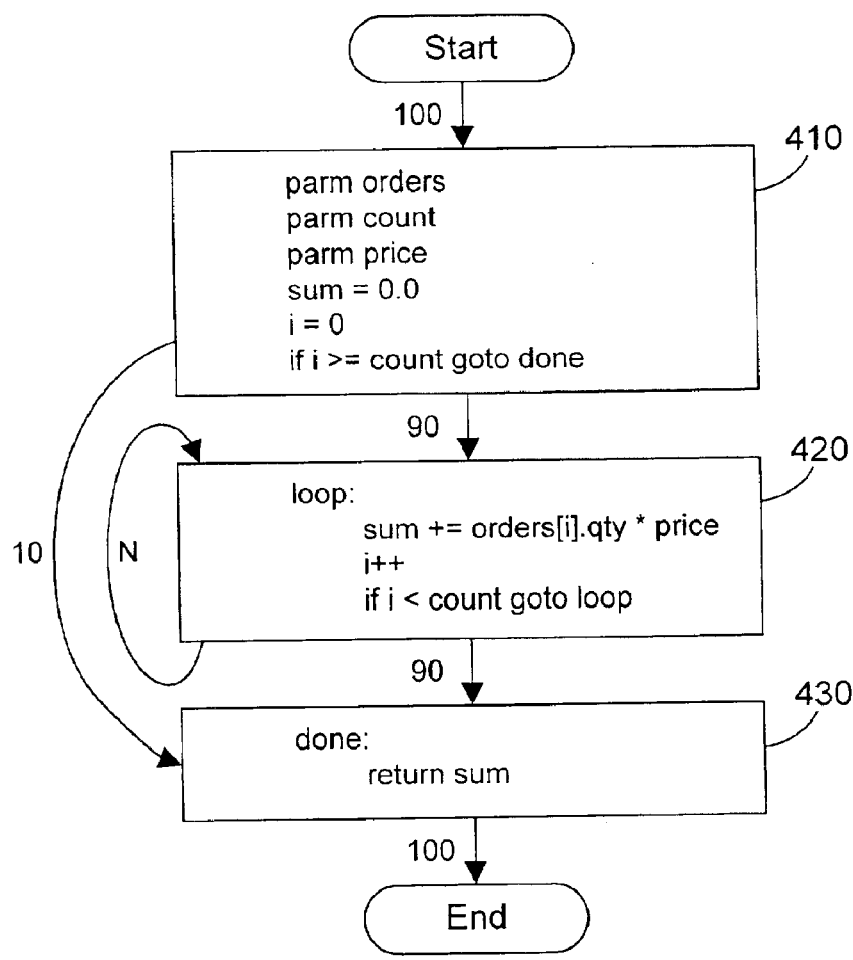
FIG. 3 is sample code for illustrating loop optimizations known in the art and loop optimizations according to the preferred embodiments.
FIG. 4 is a control flow graph including sample profile data for an intermediate code representation of the sample code of FIG. 3.

The prior art methods of peeling and unrolling are now discussed with reference to FIGS. 3–7. FIG. 3 shows a sample piece of code that includes a loop, and is therefore useful in illustrating both the prior art loop optimizations and the loop optimizations according to the preferred embodiments. The sample code of FIG. 3 shows a function sumOrders that may be invoked to sum the total of all orders in an array of orders. Line 310 shows that sumOrders receives as parameters an OrderRec that is an array of orders, an integer named "count" that specifies the number of orders to sum up, and a floating point variable named "price" that specifies the price of the items in the orders. The floating point variable "sum" is initialized to 0.0 in line 320. A loop is shown in lines 330 and 340, where the quantity for an order in the order array is multiplied by the price and added to the previous value of sum for each value of i until i=count. Once the execution of the loop is complete (i=count), the value of the floating point variable sum is returned in line 350. FIG. 3 is a simple example that allows illustrating both the prior art loop optimizations and the loop optimizations in accordance with the preferred embodiments.

A control flow graph for the sample code of FIG. 3 is shown in FIG. 4, with numbers on the arcs that indicate profile data that is collected using prior art techniques. The blocks of code 410, 420 and 430 are basic blocks, which are known in the art. We see from the profile data that the first basic block 410 is entered 100 times; that basic block 420 is entered 90 times from basic block 410, and N times from itself; that basic block 430 is entered 10 times from basic block 410 and 90 times from basic block 420, resulting in a sum of 100 for the exit of basic block 430. The number N on the arc from the end of the loop block to the beginning of the loop block is a variable whose value will determine the appropriate loop optimization, as discussed below.

Figure 5:
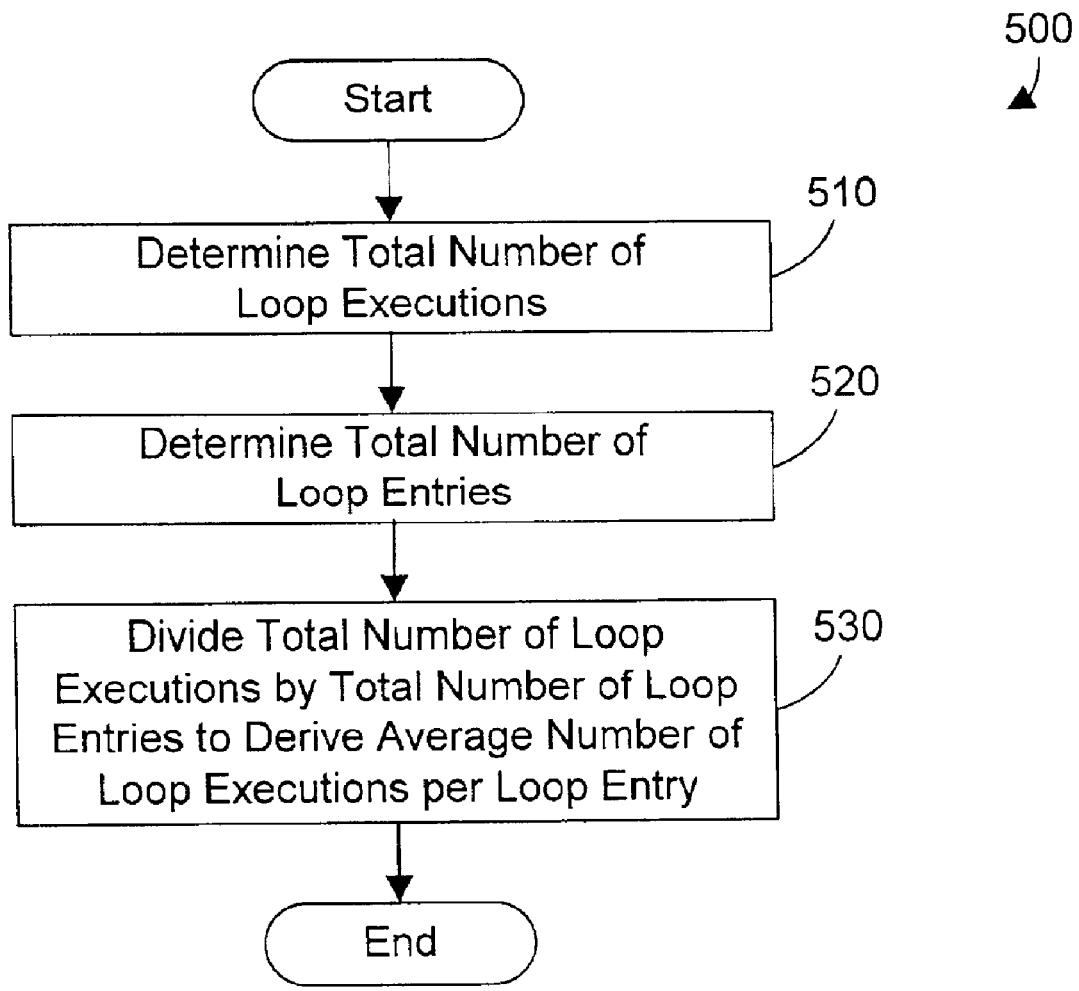
FIG. 5 is a flow diagram of a prior art method for estimating the number of executions of a loop per entry into the loop.

A known method in the prior art for determining the average number of executions per loop entry is shown as method 500 in FIG. 5. First, the total number of loop executions are determined (step 510). The total number of loop entries is also determined (step 520). The total number of loop executions is then divided by the total number of loop entries to derive the average number of loop executions per loop entry (step 530). In the prior art, once the average number of loop executions per loop entry has been computed, it is used to make decisions of whether to peel or unroll a loop, as discussed in detail below.

We now assume that a prior art optimizer uses an arbitrary peeling threshold of two executions per loop entry to decide whether to peel a loop. This means that if the average iterations per entry into a loop is two or less, the loop will be peeled a number of times P that represents a whole number that is less than two and closest to the average iterations per entry. We also assume that the prior art optimizer uses an arbitrary unrolling threshold of three. If the average iterations per entry into the loop is three or more, the loop will be unrolled a number of times U that is determined heuristically based on characteristics of the loop. For values between two and three, the prior art loop optimizer could decide to peel, unroll, or not modify the loop. Note that the thresholds of two and three are arbitrary thresholds selected to illustrate loop optimizing concepts herein. Any suitable heuristic for deciding whether to peel a loop or unroll a loop could be used, along with any suitable threshold.

Figure 6:
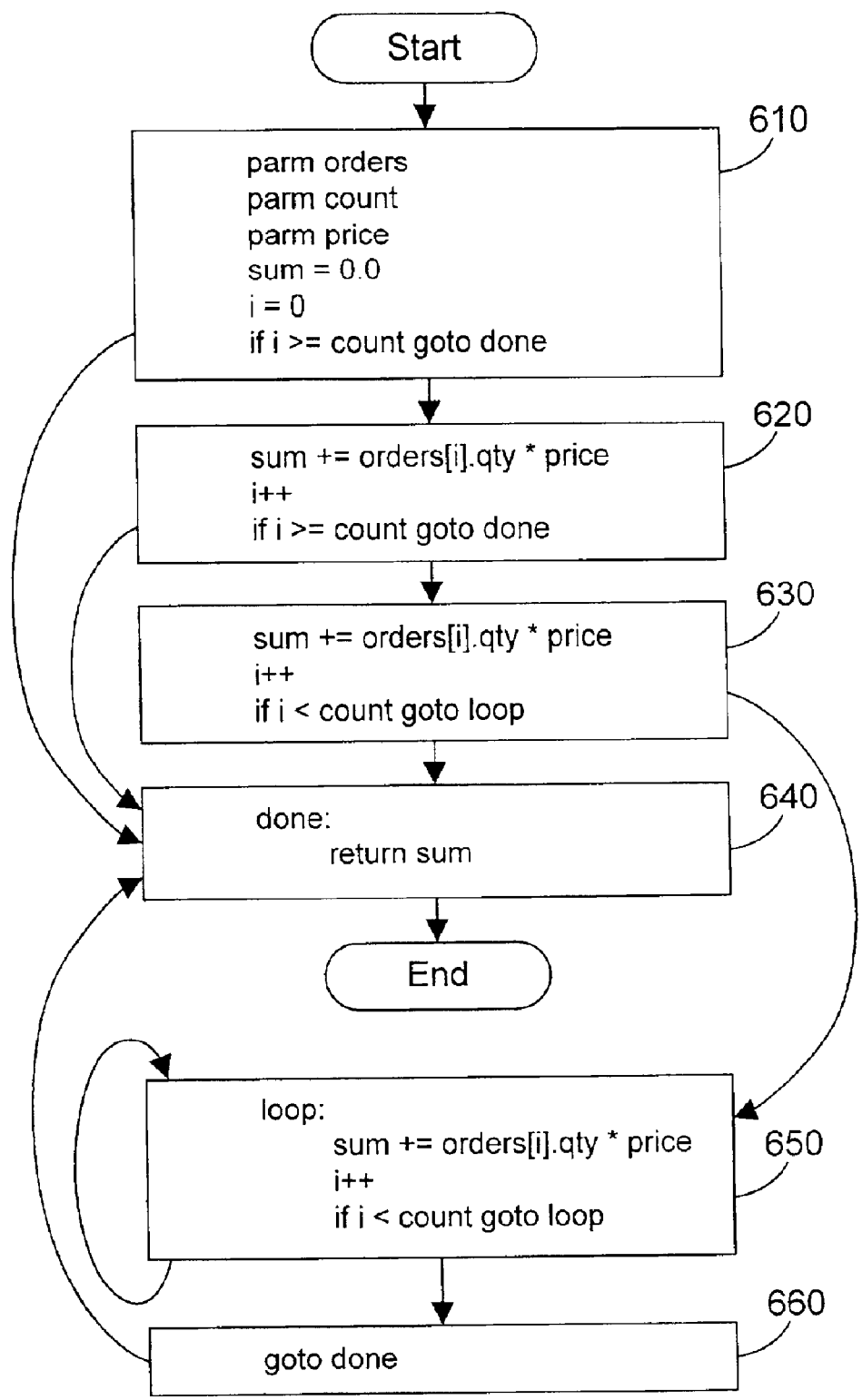
FIG. 6 is a control flow graph showing how the intermediate code of FIG. 4 may be optimized by peeling the loop twice.

Let's assume that the number N in FIG. 4 is 90. This means that the loop is executed a total of 180 times (90 from basic block 410 and 90 from N looping back on itself), while the loop is entered 90 times (from basic block 410). Using method 500 of FIG. 5, the average executions per entry for this loop is two ($180/90$). Using the peeling and looping thresholds described in the preceding paragraph, this means that the loop should be peeled twice. FIG. 6 shows a control flow graph for intermediate code that has peeled the loop twice. The body of the loop is replicated in new basic blocks 620 and 630, and a branch is inserted from block 630 to block 650 for the cases that iterate more than twice. By peeling the loop twice as shown in FIG. 6, the result is improved execution time if the loop is executed once or twice most times it is entered.

Figure 7:
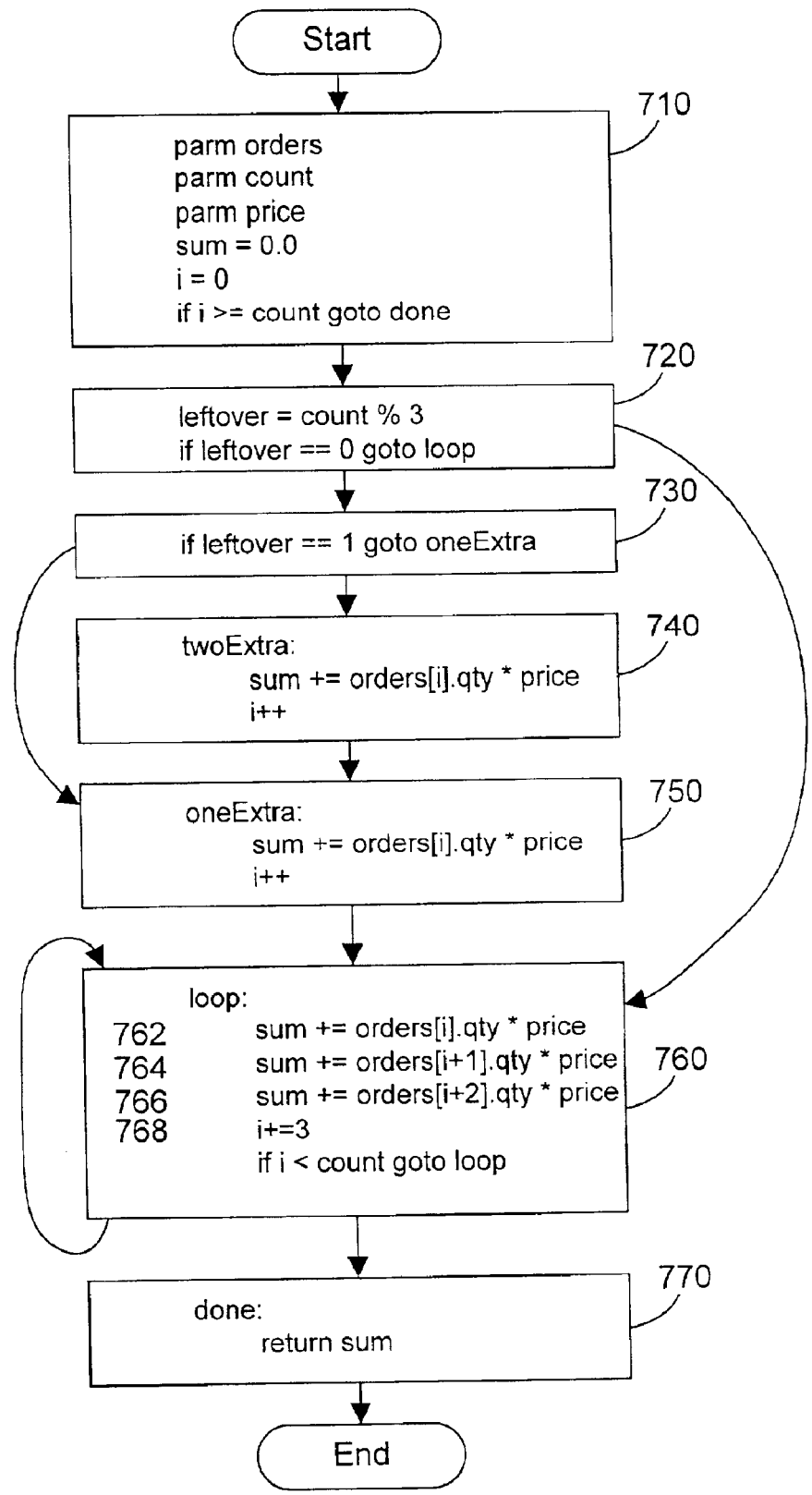
FIG. 7 is a control flow graph showing how the intermediate code of FIG. 4 may be optimized by unrolling the loop three times.

Now let's assume that the number N in FIG. 4 is 810. This means that the loop is executed a total of 900 times (90 from basic block 410 and 810 from N looping back on itself), while the loop is entered 90 times (from basic block 410). Using method 500 of FIG. 5, the average executions per entry for this loop is ten ($900/90$). Using the peeling and looping thresholds described above, this means that the loop should be unrolled. We assume for this example that the prior art determines from a suitable heuristic that the loop should be unrolled three times. FIG. 7 shows a control flow graph for intermediate code that has unrolled the loop three times. The computation in the loop is repeated three times at lines 762, 764, and 766 of block 760, so that each iteration of the loop performs three times as many computations as before. Note that the increment value must be increased to three in line 768. Note also that special code must be inserted to account for the fact that the loop will not always be executed in multiples of three. A new block 720 is created that looks at the variable "count", and writes a value to a variable "leftover" that is the count modulo three. If the leftover value is zero, execution can drop directly to the loop 760. If the leftover value is one, control branches to block oneExtra 750 before entering the loop 760. If the leftover value is two, the blocks 740 and 750 are both performed before entering the loop 760. In this manner, any number of iterations that are not a multiple of three are accounted for in blocks 720, 730, 740 and 750. While there is a small performance penalty for performing these "extra" computations, in theory this penalty is more than compensated for by the increased performance that results from performing multiple computations for each execution of the loop.

There are other ways to unroll a loop that are known in the art. Rather than providing the oneExtra and twoExtra blocks shown in FIG. 7, a compensation loop may be provided that repeats the loop body and executes a number of times corresponding to the leftover iterations. In addition, the unroll factor may be set to a factor of the mode in order to minimize early exits from the unrolled loop, or may be set to a value that will most frequently avoid the compensation code that must be present when the actual iterations are not a multiple of the unroll factor. The concepts of loop peeling and loop unrolling are well-known in the art. For a description of some prior art methods for peeling and unrolling, see Hwu et al. "The Superblock: An Effective Technique for VLIW and Superscaler Compilation", The Journal of Supercomputing, p. 229–248 (1993).

The prior art methods for optimizing loops make a decision to either peel a loop, unroll the loop, or leave the loop alone. Nowhere does the prior art teach performing both peeling and unrolling on a loop. Furthermore, nowhere does the prior art teach collecting profile data that directly indicates the number of times a loop is executed each time the loop is entered. These features are found only in the preferred embodiments, discussed in detail below.

2.0 Detailed Description

The preferred embodiments provide a compiler that performs enhanced loop optimizations. New instrumentation code is generated for each loop that collects profile data in an execution frequency table that corresponds to the loop. The execution frequency table gives enhanced information that allows a more intelligent choice of whether to peel or unroll a loop according to a dominant mode, if present, in the execution frequency table. In addition, the loop optimizer of the preferred embodiments may perform a combination of peeling and unrolling on a single loop depending on the information in the execution frequency table. In this manner, the performance of loops is enhanced.

Figure 8:
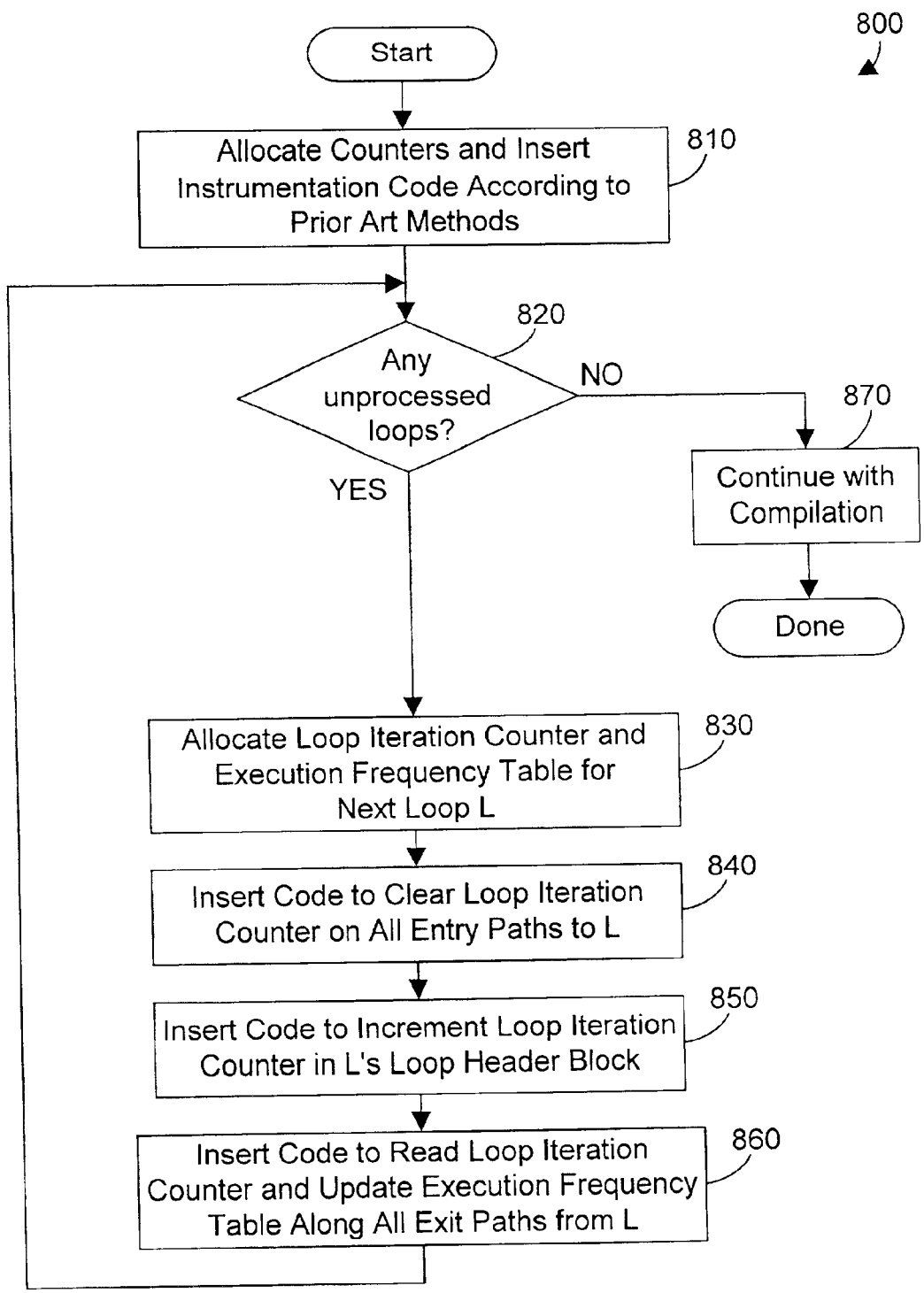
FIG. 8 is a flow diagram of a method for instrumenting loops in a computer program to collect detailed profile data in an execution frequency table in accordance with the preferred embodiments.

Referring now to FIG. 8, a method 800 in accordance with the preferred embodiments inserts additional instrumentation code into an instruction stream to collect the more detailed profile data needed to optimize loops in accordance with the preferred embodiments. First, counters are allocated and the instrumentation code for those counters is inserted into the instruction stream according to prior art methods (step 810). Next method 800 determines whether there are any unprocessed loops (step 820). If so (step 820=YES), a loop iteration counter and execution frequency table is allocated for the selected loop L (step 830). Next, code is inserted to clear the loop iteration counter on all entry paths to the selected loop L (step 840). Code is then inserted to increment the loop iteration counter in the selected loop L's header block (step 850). Finally, code is inserted to read the loop iteration counter and update the execution frequency table along all exit paths from the selected loop L (step 860). In this manner, steps 830–860 insert additional instrumentation code that collects more detailed profile data in the loop's execution frequency table to allow for a more intelligent choice of loop optimization. Control then passes back to step 820. If more loops need to be processed (step 820=YES), steps 830–860 are repeated for each loop, until no more loops need to be processed (step 820=NO). At this point, the code has been instrumented, and the compiler may continue with compilation (step 870).

Figure 9:
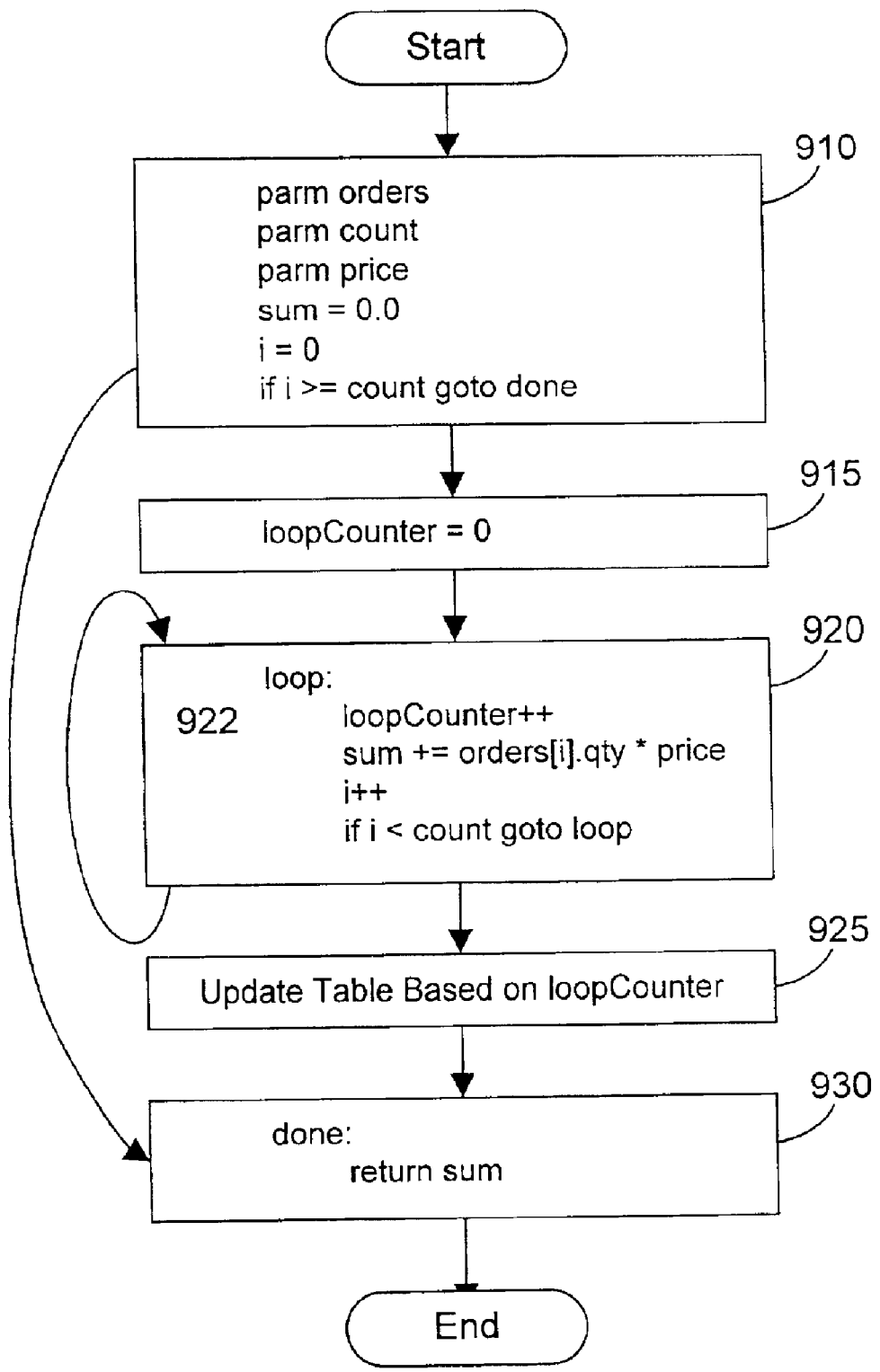
FIG. 9 is a control flow graph of the sample code of FIG. 3 after inserting the additional instrumentation code discussed in FIG. 8.

FIG. 9 shows a control flow graph of the sample code in FIG. 3 after inserting the additional instrumentation code in steps 830–860 of FIG. 8. Step 830 in FIG. 8 allocates the loop iteration counter and execution frequency table. This allocation step is not reflected in the control flow graph in FIG. 9. Step 840 inserts block 915 to clear the loop iteration counter "loopCounter". The increment instruction at line 922 of block 920 is inserted in step 850. Finally, block 925 is added in step 860 to update the execution frequency table based on the value of loopCounter. Note that the prior art instrumentation code is not shown in FIG. 9 to more clearly illustrate the improvements of the preferred embodiments.

Figure 10:
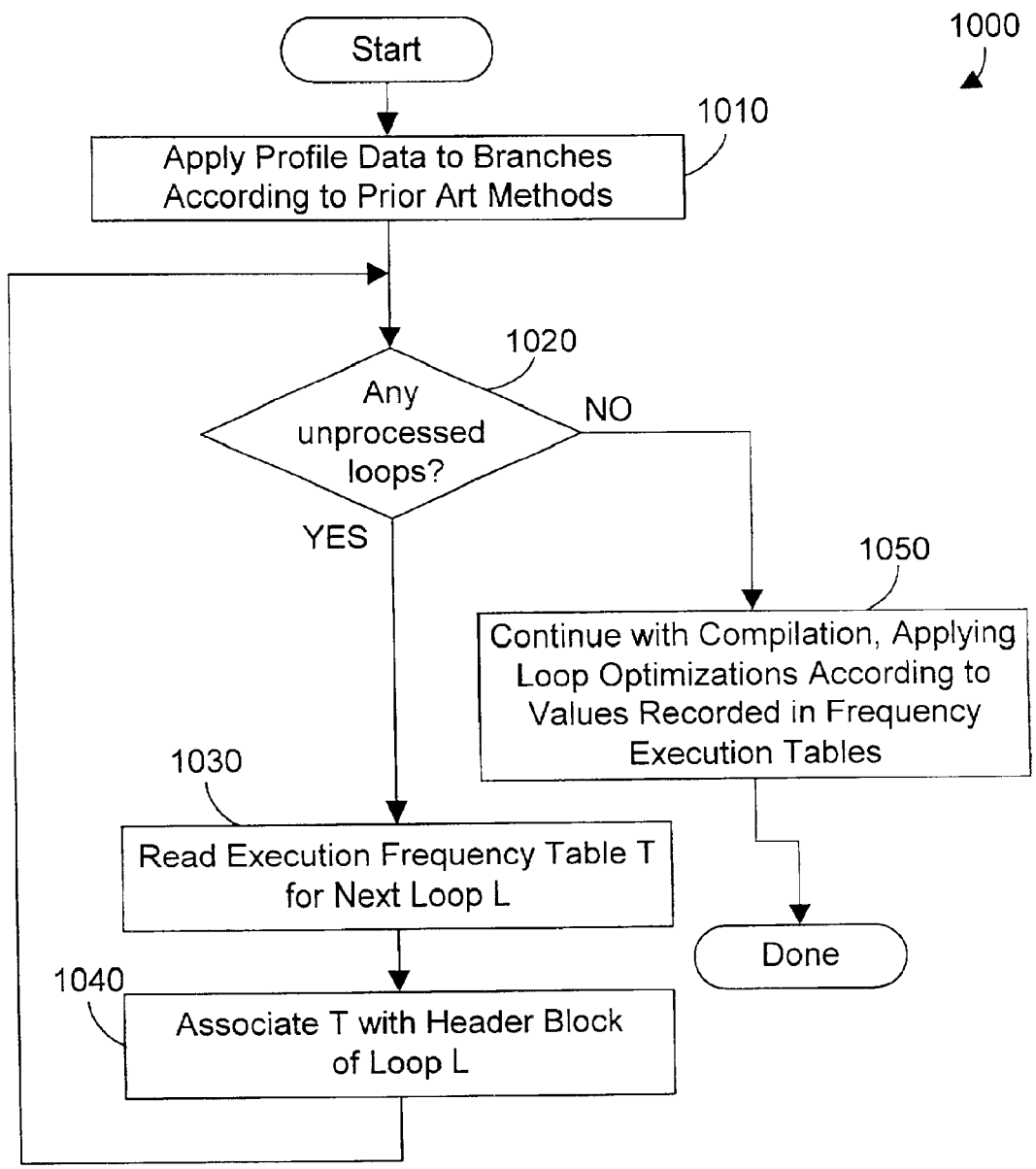
FIG. 10 is a flow diagram of a method for optimizing loops in a computer program using profile data residing in one or more execution frequency tables in accordance with the preferred embodiments.

We assume that the instrumented code shown in FIG. 9 is then executed with sample inputs to generate profile data. Once the profile data has been generated, method 1000 of FIG. 10 shows how the data in the execution frequency tables are used in optimizing loops in accordance with the preferred embodiments. The profile data is applied to branches according to prior art methods (step 1010). If there is a loop to process (step 1020=YES), the execution frequency table for the loop L is read (step 1030) and associated with the header block of loop L (step 1040). Steps 1030 and 1040 are preferably repeated for all loops until there are no more loops to process (step 1020=NO). At this point the compilation can continue, with loop optimizations based on profile data stored in the execution frequency tables for the loops (step 1050).

Figure 11:
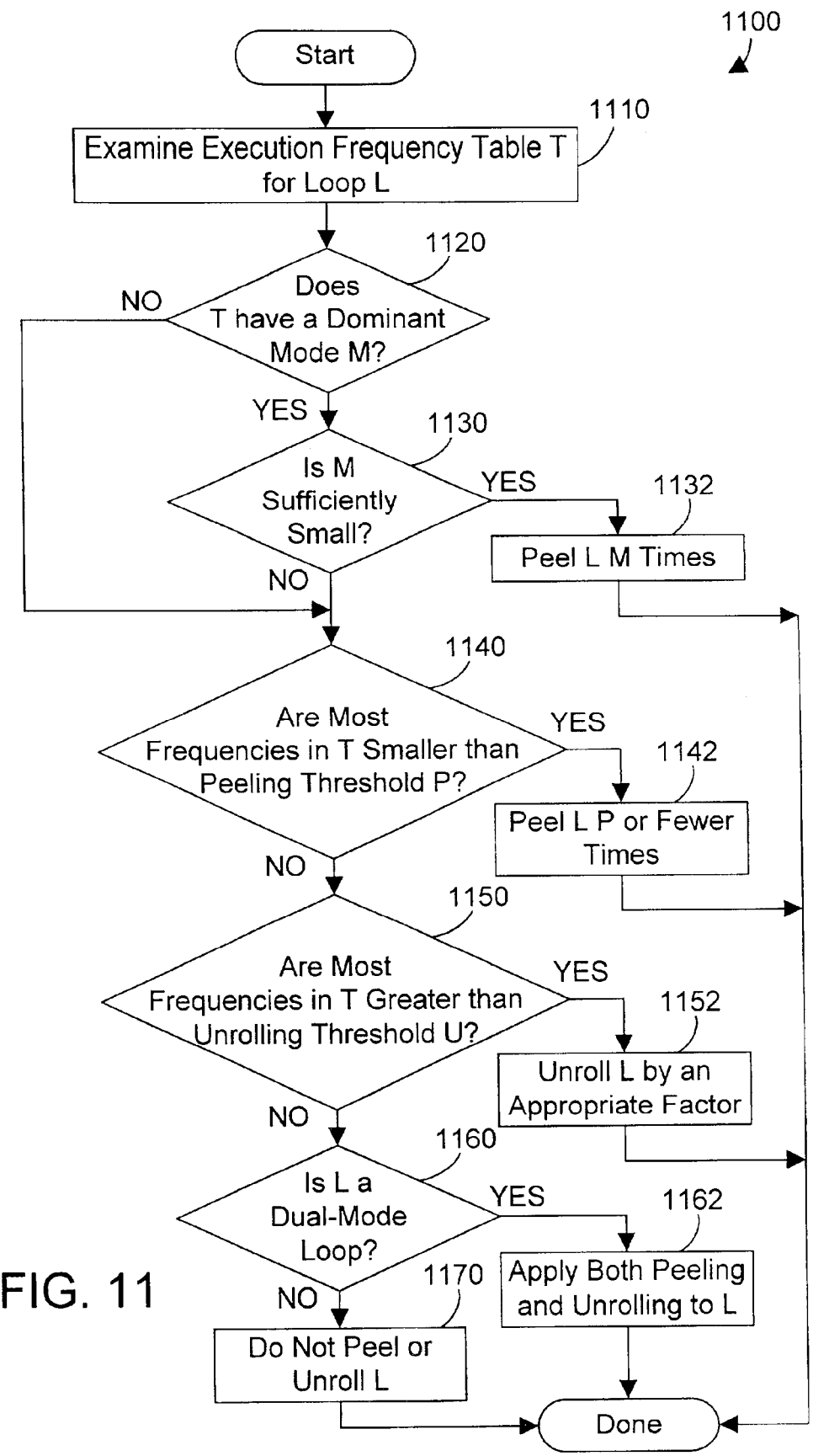
FIG. 11 is a flow diagram of a method for optimizing loops by processing the profile data in one or more execution frequency tables in accordance with the preferred embodiments.

Referring to FIG. 11, a method 1100 is one specific method that may be performed during step 1050 of FIG. 10 to optimize one or more loops according to the profile data stored in the execution frequency tables. First, an execution frequency table T for a selected loop L is examined (step 1110). If the profile data in T has a dominant mode M (step 1120=YES), method 1100 then determines whether M is sufficiently small to benefit from peeling of the loop (step 1130). In our example above, the peeling threshold was arbitrarily selected as two. If the dominant mode M is sufficiently small (step 1130=YES), loop L is peeled M times (step 1132). If the execution frequency table T for L does not have a dominant mode M (step 1120=NO), or if M is not sufficiently small (step 1130=NO), control passes to step 1140. If most of the frequencies in T are smaller than the peeling threshold P (step 1140=YES), the loop L is peeled P or fewer times (step 1142). If most of the frequencies in T are larger than the peeling threshold P (step 1140=NO), method 1100 then checks to see if most of the frequencies in T are greater than the unrolling threshold U (step 1150). If so (step 1150=YES), loop L is unrolled by an appropriate factor that is determined heuristically using any suitable method, including prior art methods (step 1152). If it is not true that most of the frequencies in T are greater than the unrolling threshold U (step 1150=NO), method 1100 then checks to see if loop L is a dual-mode loop (step 1160). If so (step 1160=YES), both peeling and unrolling are applied to loop L (step 1162). If not (step 1160=NO), loop L is neither peeled nor unrolled (step 1170). Note that the thresholds described herein and their relationship to the general method 1100 in FIG. 11 may vary. For example, the peeling threshold of two herein is assumed to mean that a loop is peeled if its dominant mode, or most of its execution frequencies, are one or two. In other words, the peeling threshold could be specified as "less than or equal to two". Similar results may be achieved with a peeling threshold of "less than three". In addition, the sample unrolling threshold herein is expressed as "greater than or equal to three". This threshold could also be expressed as "greater than two". The sample peeling and unrolling thresholds are selected herein as arbitrary examples that illustrate the general concepts of the preferred embodiments, and no significance should be placed on their particular values or whether or not peeling or unrolling is performed when the dominant mode equals the threshold value.

Figures 12, 13:
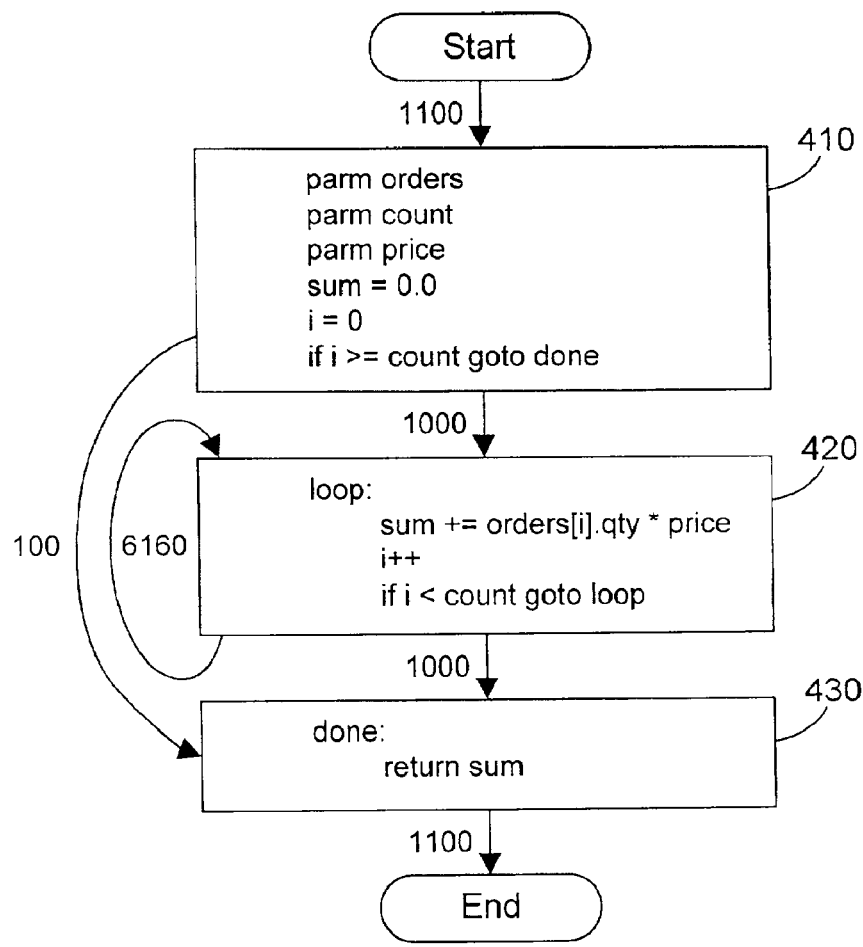
FIG. 12 is a control flow graph similar to the control flow graph of FIG. 3 with different profile data to illustrate a first aspect of the preferred embodiments.
FIG. 13 is a sample execution frequency table that could correspond to the profile data shown in FIG. 12 to allow comparison of the preferred embodiments to the prior art.

Various examples are now presented to illustrate each of the steps 1132, 1142, 1152, and 1162 in method 1100 of FIG. 11. Referring to FIG. 12, a control flow graph is shown that is identical to the control flow graph of FIG. 3, except that the values of the profile data on the branches has changed. We see that the loop in block 420 is entered a total of 7,160 times, 1,000 times from block 410, and 6,160 times from itself. Using the prior art method in FIG. 5, the estimated average number of executions per loop entry is $7,160/1,000$, or 7.16. Using a peeling threshold of two and an unrolling threshold of three (as with the other prior art examples above), the prior art would decide to unroll the loop.

One sample configuration for an execution frequency table is shown in the table 1310 of FIG. 13. This particular execution frequency table 1310 includes five entries that are rows in the table. Each entry has an execution count that represents the number of times the loop was executed, and a frequency value that is incremented as the instrumented code is run when the number of times the loop was executed per entry corresponds to the execution count. Thus, for the instrumented code in FIG. 9, assuming the profile data shown in FIG. 13, there were ten times during the execution of the instrumented code that the loop was executed only once when it was entered. There were 800 times during the execution of the instrumented code that the loop was executed twice when it was entered. There were 60 times during the execution of the instrumented code that the loop was executed three times when it was entered. There were 30 times during the execution of the instrumented code that the loop was executed four times when it was entered. And there were 100 times during the execution of the instrumented code that the loop was executed five or more times when it was entered. We assume for the sake of illustration that the 100 times in the "5 or more" entry represents 50 times at five executions per entry, and 50 times at 100 executions per entry. Note that the profile data in the execution frequency table 1310 of FIG. 13 corresponds to more detailed profile data for the same profile data in FIG. 12.

In the preferred embodiments, the execution frequency table of the preferred embodiments is an array of N counters. The size of the array is configurable based on the needs of subsequent optimization phases. The Kth entry, where K<N, counts how many times the loop iterated exactly K times before exiting. The Nth entry counts how many times the loop iterated N or more times before exiting. Note that this configuration could be changed according to specific needs. For example, instead of assigning an integer value to each entry, with the count showing the number of times the loop was executed that integer value before exiting, each entry could instead correspond to a range, with the count showing the number of times the loop was executed in that range before exiting. Thus, instead of having entries with execution counts of 1, 2, 3, 4, and 5 or more as shown in FIG. 13, an execution frequency table of the preferred embodiments could instead include entries with execution count ranges of 1–2, 3–4, 5–6, 7–8, and 9 or more. In another variation, the execution frequency table could be set up to track the N most frequently occurring iteration counts, rather than just 1 through N−1 and >=N. In the alternative, entries in the execution frequency table could be used to track iteration counts with specific characteristics (e.g., multiple of 2 or 3, power of 2, etc.) to drive optimizations that can take advantage of that information. The preferred embodiments expressly extend to the collection of profile data in any execution frequency table that includes two or more entries.

The execution frequency table 1310 of FIG. 13 clearly has a dominant mode of two executions of the loop per entry into the loop, as shown by the count of 800, which accounts for the majority of counts recorded in table 1310. Using the same peeling threshold of two and unrolling threshold of three used in the prior art examples above, a mode of two would mean that the loop should be peeled twice, resulting in the optimized code shown in FIG. 6. While FIG. 6 also represents the way the prior art would peel the loop twice, the decision of whether or not to peel is made differently in the prior art compared to the preferred embodiments. As stated above, with the assumption that the "5 or more" entry in table 1310, which shows a frequency of 100, is comprised of 50 occurrences of 5 executions per entry and 50 occurrences of 100 executions per entry, the total executions of the loop would be (1*10)+(2*800)+(3*60)+(4*30)+(5*50)+(100*50)=7,160, which matches the profile data for the prior art example shown in FIG. 12. Assuming the same peeling and looping thresholds, the prior art would decide to unroll the loop, while the preferred embodiments, by using the dominant mode, recognizes that the loop is better optimized by peeling it twice. Using different heuristics, the preferred embodiments might also decide to both peel and unroll this loop.

Figures 14, 15:
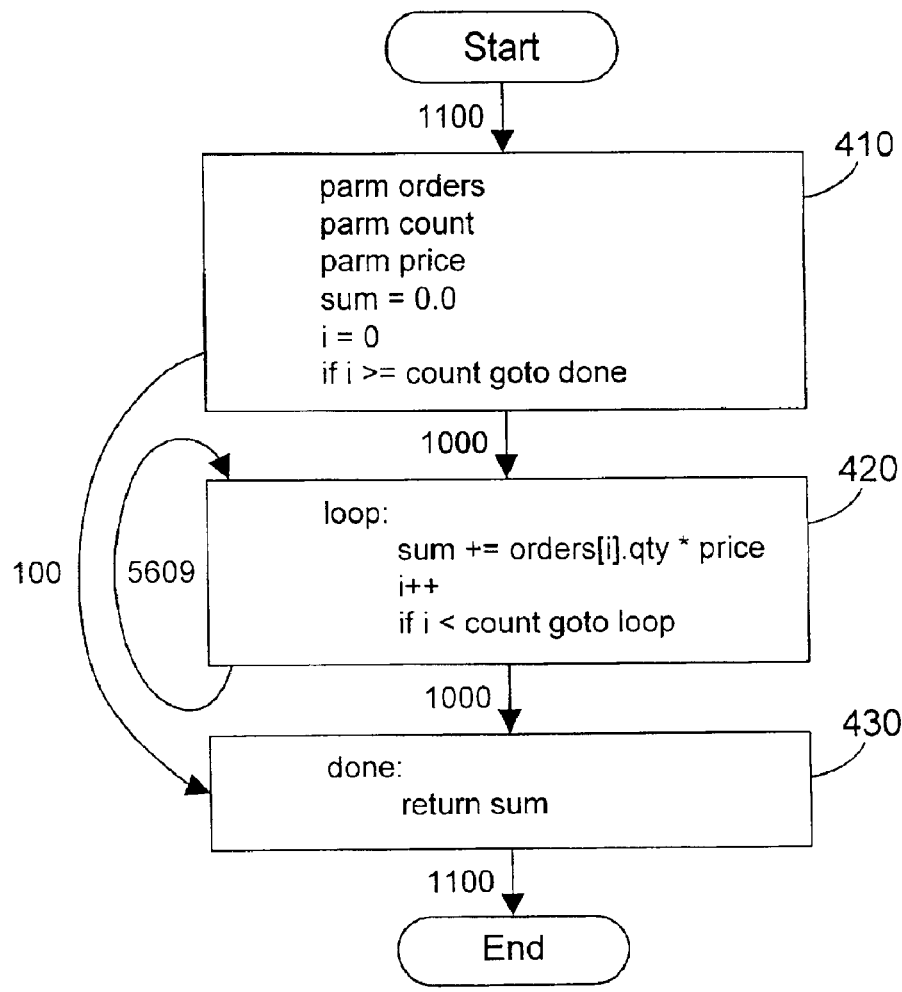
FIG. 14 is a control flow graph similar to the control flow graph of FIG. 3 with different profile data to illustrate a second aspect of the preferred embodiments.
FIG. 15 is a sample execution frequency table that could correspond to the profile data shown in FIG. 14 to allow comparison of the preferred embodiments to the prior art.

We now change the profile data to illustrate the other cases in the preferred embodiments represented by steps 1142, 1152 and 1162 of FIG. 11. Referring to FIG. 14, the control flow graph is identical to the control flow graphs in FIGS. 4 and 12 with the exception of the profile data values. Using prior art method 500 of FIG. 5, we see that the loop is executed a total of 6,609 times, and it is entered a total of 1,000 times, resulting in an average execution per entry of $6,609/1,000=6.609$. Based on this value, the prior art would unroll the loop. We now analyze how the preferred embodiments would process more detailed profile data that is stored in an execution frequency table to compare the preferred embodiments to the prior art.

For the execution frequency table 1510 in FIG. 15, there is no dominant mode, because mode "1" has a count of 446 and mode "2" has a count of 450. As a result, in FIG. 11, step 1120=NO. However, most of the frequencies (446 for one and 450 for two) are smaller than the peeling threshold P of two (step 1140=YES), so L is still peeled P or fewer times. For the profile data in the execution frequency table 1510 in FIG. 15, we assume that L is peeled twice, because the execution frequencies for modes one and two contain most of the counts. The result is the optimized code shown in FIG. 6. With the assumption that the "5 or more" entry in table 1510, which shows a frequency of 100, is comprised of 50 occurrences of 5 executions per entry and 50 occurrences of 100 executions per entry, the total executions of the loop would be (1*446)+(2*450)+(3*3)+(4*1)+(5*50)+(100*50)=6,609, which matches the profile data for the prior art example shown in FIG. 14. Assuming the same peeling and looping thresholds, the prior art would decide to unroll the loop, while the preferred embodiments recognize that the loop is better optimized by peeling it twice.

Figures 16, 17:
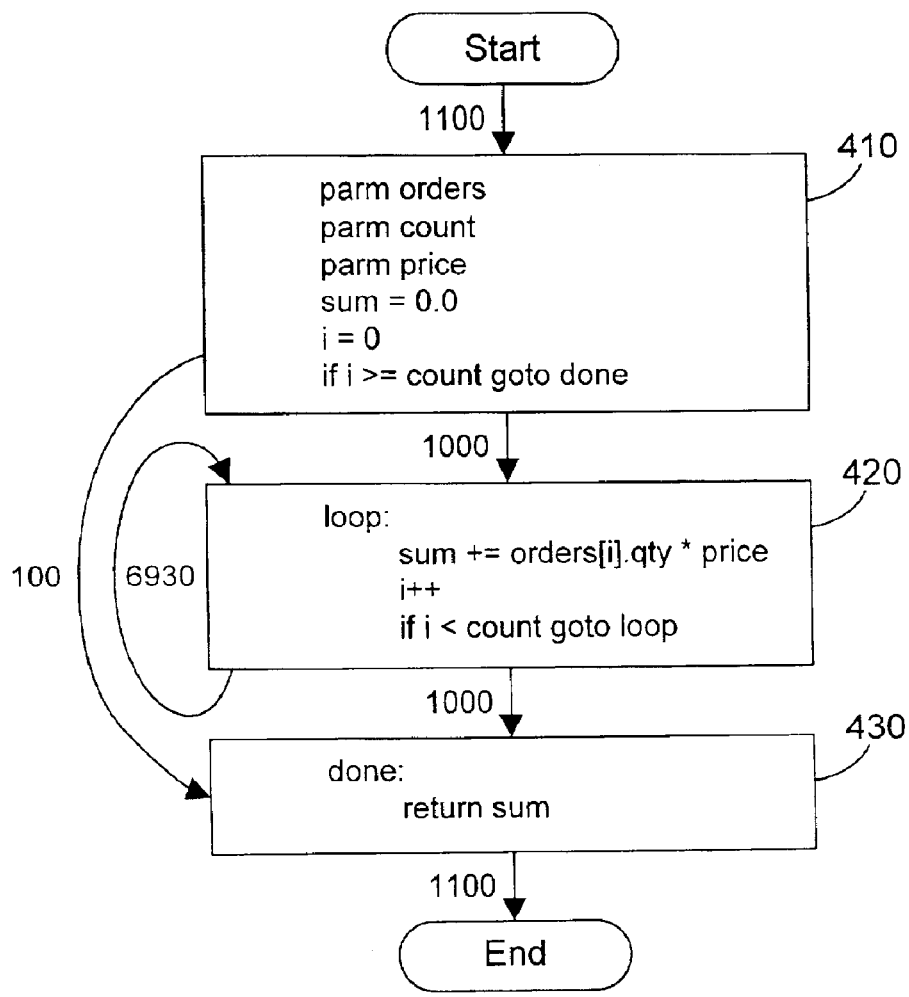
FIG. 16 is a control flow graph similar to the control flow graph of FIG. 3 with different profile data to illustrate a third aspect of the preferred embodiments.
FIG. 17 is a sample execution frequency table that could correspond to the profile data shown in FIG. 16 to allow comparison of the preferred embodiments to the prior art.

Referring to FIG. 16, the control flow graph is identical to the control flow graphs in FIGS. 4, 12 and 14 with the exception of the profile data values. Using prior art method 500 of FIG. 5, we see that the loop is executed a total of 7,930 times, and it is entered a total of 1,000 times, resulting in an average execution per entry of $7,930/1,000=7.93$. Based on this value, the prior art would unroll the loop. We now analyze how the preferred embodiments would process more detailed profile data that is stored in an execution frequency table to compare the preferred embodiments to the prior art.

For the execution frequency table 1710 of FIG. 17, there is a dominant mode (step 1120=YES), but mode "3" is greater than the peeling threshold of two, and is therefore not sufficiently small to peel (step 1130=NO). Most frequencies in T are not smaller than the peeling threshold (step 1140=NO), but most are greater than or equal to the unrolling threshold of three (step 1150=YES). As a result, loop L is unrolled by an appropriate factor (step 1152). We assume for this example that L is unrolled three times based on some heuristic that analyzes the loop to determine the appropriate number of times the loop should be unrolled, resulting in the optimized code of FIG. 7. With the assumption that the "5 or more" entry in table 1710, which shows a frequency of 100, is comprised of 50 occurrences of 5 executions per entry and 50 occurrences of 100 executions per entry, the total executions of the loop would be (1*40)+(2*20)+

(3*760)+(4*80)+(5*50)+(100*50)=7,930, which matches the profile data for the prior art example shown in FIG. 16. In this case, both the prior art and the preferred embodiments would decide to unroll the loop. The difference is that the decision to unroll in the preferred embodiments is made by analyzing the more detailed profile data in the execution frequency table 1710, rather than basing the decision on an average number of executions per loop entry, as is done in the prior art.

Figures 18, 19:
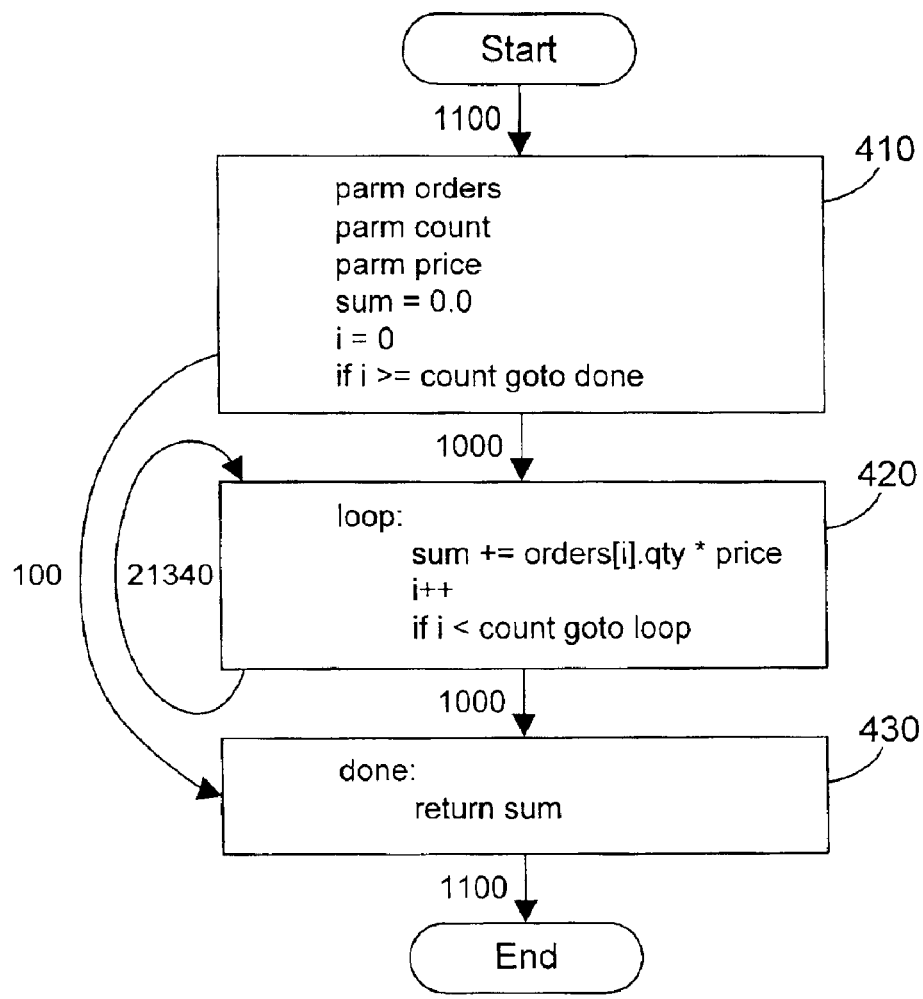
FIG. 18 is a control flow graph similar to the control flow graph of FIG. 3 with different profile data to illustrate a fourth aspect of the preferred embodiments.
FIG. 19 is a sample execution frequency table that could correspond to the profile data shown in FIG. 18 to allow comparison of the preferred embodiments to the prior art.

Referring to FIG. 18, the control flow graph is identical to the control flow graphs in FIGS. 4, 12, 14 and 16 with the exception of the profile data values. Using prior art method 500 of FIG. 5, we see that the loop is executed a total of 22,340 times, and it is entered a total of 1,000 times, resulting in an average execution per entry of $22,340/1,000$= 22.34. Based on this value, the prior art would unroll the loop. We now analyze how the preferred embodiments would process more detailed profile data that is stored in an execution frequency table to compare the preferred embodiments to the prior art.

Figure 20:
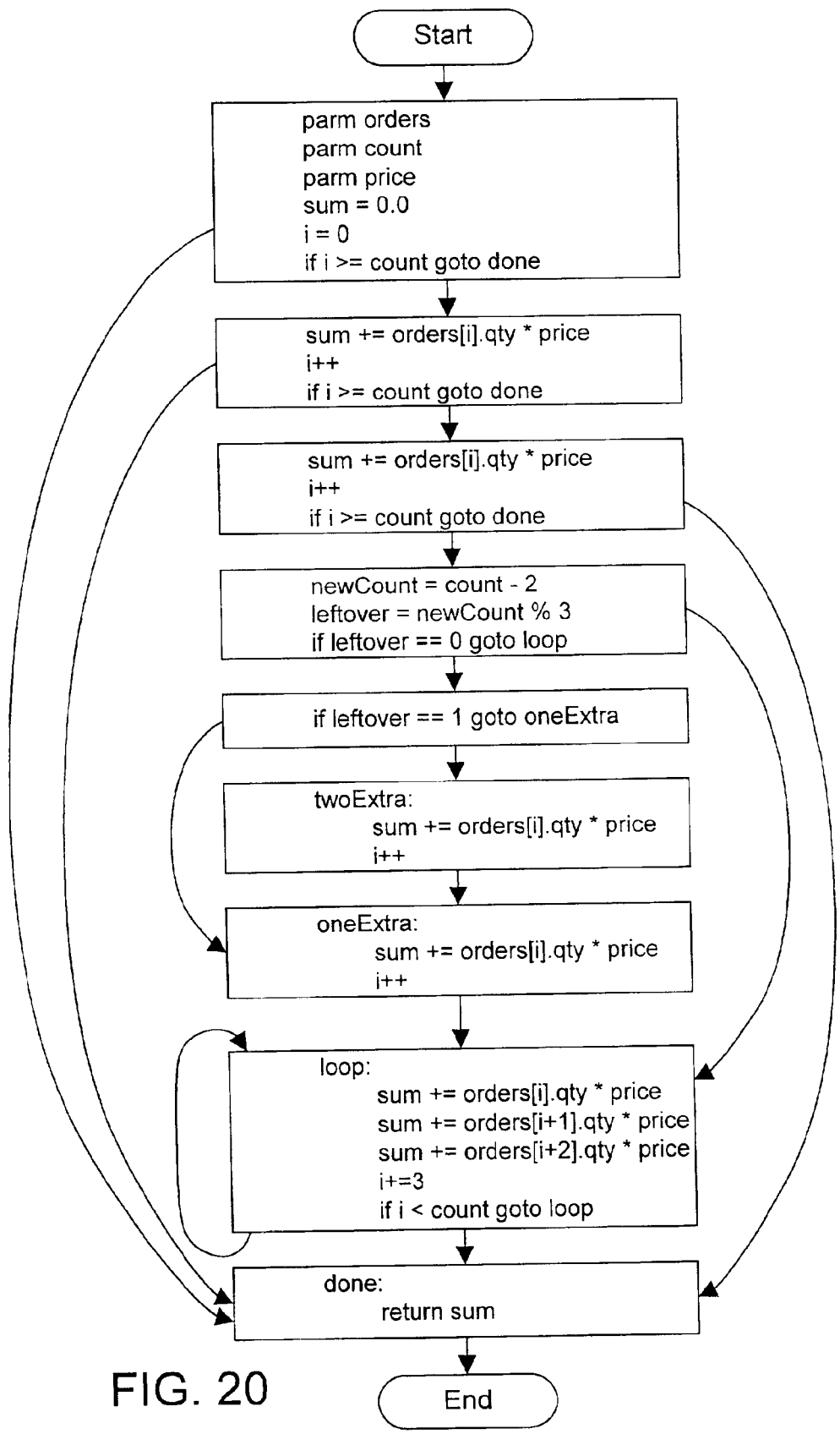
FIG. 20 is a control flow graph showing how the sample code of FIG. 3 may be optimized by peeling the loop twice and unrolling the loop three times according to the data in the execution frequency table of FIG. 19.

For the execution frequency table 1910 of FIG. 19, there is no dominant mode because mode "2" and mode "5 or more" each have execution frequencies of 400. As a result, step 1120=NO. Most of the frequencies are not smaller than the peeling threshold (step 1140=NO), most are not greater than the unrolling threshold (step 1150=NO). But the profile data in execution frequency table 1910 shows that the loop is a dual-mode loop that may benefit from both peeling and unrolling (step 1160=YES). As a result, the loop is peeled twice and unrolled three times, resulting in the optimized code shown in FIG. 20. With the assumption that the "5 or more" entry in table 1910, which shows a frequency of 400, is comprised of 200 occurrences of 5 executions per entry and 200 occurrences of 100 executions per entry, the total executions of the loop would be (1*70)+(2*400)+(3*50)+(4*80)+(5*200)+(100*200)=22,340, which matches the profile data for the prior art example shown in FIG. 18. With the profile data in FIG. 18, the prior art would decide to unroll the loop based on the average executions per loop entry of 22.34, but would not perform any peeling on the loop. In the prior art, the concepts of peeling and unrolling are mutually-exclusive. Either peeling is performed, unrolling is performed, or neither is performed. Nowhere does the prior art teach that a loop may be optimized by both peeling and unrolling the same loop. This combination of peeling and unrolling is unique to the preferred embodiments, and may significantly enhance the performance of the loop.

Figure 21:
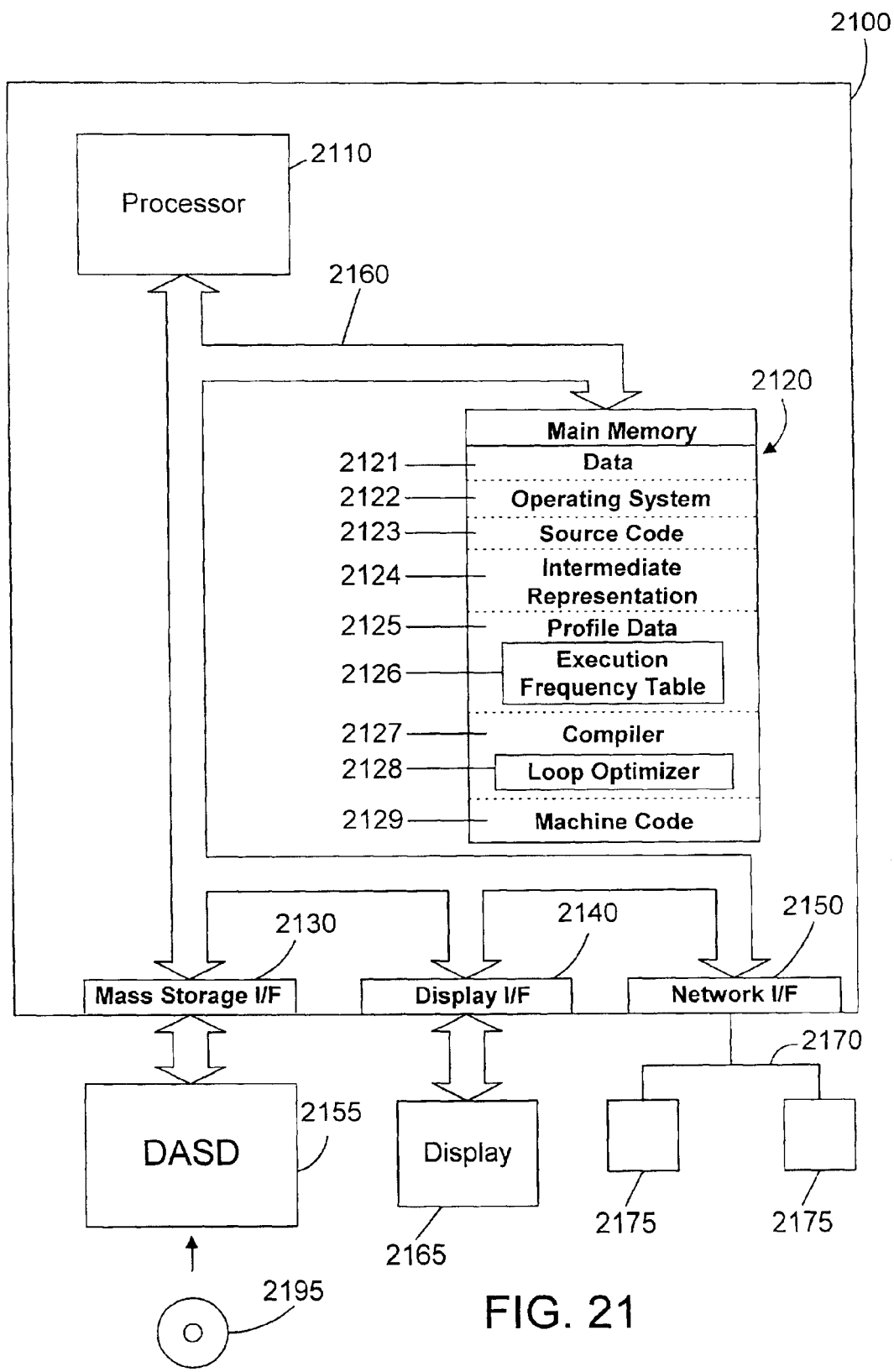
FIG. 21 is a block diagram of an apparatus in accordance with the preferred embodiments.

Referring now to FIG. 21, a computer system 2100 is one suitable implementation of an apparatus in accordance with the preferred embodiments of the invention. Computer system 2100 is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 21, computer system 2100 comprises a processor 2110, a main memory 2120, a mass storage interface 2130, a display interface 2140, and a network interface 2150. These system components are interconnected through the use of a system bus 2160. Mass storage interface 2130 is used to connect mass storage devices (such as a direct access storage device 2155) to computer system 2100. One specific type of direct access storage device 2155 is a readable and writable CD ROM drive, which may store data to and read data from a CD ROM 2195.

Main memory 2120 in accordance with the preferred embodiments contains data 2121, an operating system 2122, source code 2123, an intermediate representation 2124, profile data 2125, a compiler 2127, and machine code 2129. Profile data 2125 is data collected by any suitable profiling method, including without limitation instrumenting profilers and sampling profilers. Profile data 2125 suitably includes counts of the number of times a branch is taken, and also includes one or more execution frequency tables 2126. Compiler 2127 includes a loop optimizer 2128 that may optimize loops in the intermediate representation 2124 according to profile data stored in the execution frequency tables 2126. The execution frequency table 2126 and the functions of loop optimizer 2128 are described in detail above with respect to FIGS. 6–20. Note that the profiler that generates the instrumentation code (FIGS. 8 and 9) and stores the profile data 2125 in the execution frequency tables 2126 is not explicitly shown in FIG. 21, but is assumed to be part of compiler 2127.

Note that the source code 2123, intermediate representation 2124, profile data 2125, compiler 2127, and machine code 2129 are all shown residing in memory 2120 for the convenience of showing all of these elements in one drawing. One skilled in the art will appreciate that this is not the normal mode of operation for most compilers. A frontend compiler may process source code 2123 and generate therefrom intermediate representation 2124. This processing may occur on a computer system separate from computer system 2100. A profiler may then insert instrumentation code into the intermediate representation 2124, and run the instrumented code on a different computer system to collect profile data 2125. Compiler 2127 processes intermediate representation 2124 and generates therefrom machine code 2129, which may also occur on a separate computer system. In the extreme, source code 2123 could reside on a first computer system and a front-end compiler could reside on a second computer system. The front-end compiler could read the source code 2123 from the first computer system, generate the intermediate representation 2124, and store the intermediate representation 2124 on a third computer system. A profiler could then read the intermediate representation 2124 from the third computer system, insert instrumentation code, and store the instrumented code on a fourth computer system. The profiler could then read the instrumented code from the fourth computer system, execute the instrumented code on a fifth computer system, and store the resulting profile data on a sixth computer system. Compiler 2127 could be executed on a seventh computer system, which reads the intermediate representation 2124 from the third computer system and the profile data from the sixth computer system, and generates therefrom machine code 2129, which could be written to an eighth computer system. This simple example shows that the preferred embodiments expressly extend to any suitable configuration and number of computer systems to accomplish the front-end and back-end compiling. The "apparatus" described herein and in the claims expressly extends to a multiple computer configuration, as described by the example above.

Computer system 2100 utilizes well known virtual addressing mechanisms that allow the programs of computer system 2100 to behave as if they only have access to a large, single storage entity instead of access to multiple, smaller storage entities such as main memory 2120 and DASD device 2155. Therefore, while data 2121, operating system 2122, source code 2123, intermediate representation 2124, profile data 2125, compiler 2127, and machine code 2129 are shown to reside in main memory 2120, those skilled in the art will recognize that these items are not necessarily all completely contained in main memory 2120 at the same time. It should also be noted that the term "memory" is used herein to generically refer to the entire virtual memory of computer system 2100, and may include the virtual memory of other computer systems coupled to computer system 2100.

Data 2121 represents any data that serves as input to or output from any program in computer system 2100. Operating system 2122 is a multitasking operating system known in the industry as OS/400; however, those skilled in the art will appreciate that the spirit and scope of the present invention is not limited to any one operating system. Source code 2123 is a computer program or portion thereof written in a high-level language. Intermediate representation 2124 is intermediate code that is generated from the source code 2123 by a front-end compiler, which may be compiler 2127, or may be a different compiler not shown in FIG. 21. Machine code 2129 is the executable code generated by the compiler 2127 from the intermediate representation 2124.

Processor 2110 may be constructed from one or more microprocessors and/or integrated circuits. Processor 2110 executes program instructions stored in main memory 2120. Main memory 2120 stores programs and data that processor 2110 may access. When computer system 2100 starts up, processor 2110 initially executes the program instructions that make up operating system 2122. Operating system 2122 is a sophisticated program that manages the resources of computer system 2100. Some of these resources are processor 2110, main memory 2120, mass storage interface 2130, display interface 2140, network interface 2150, and system bus 2160.

Although computer system 2100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 2110. However, those skilled in the art will appreciate that the present invention applies equally to computer systems that simply use I/O adapters to perform similar functions.

Display interface 2140 is used to directly connect one or more displays 2165 to computer system 2100. These displays 2165, which may be non-intelligent (i.e., dumb) terminals or fully programmable workstations, are used to allow system administrators and users to communicate with computer system 2100. Note, however, that while display interface 2140 is provided to support communication with one or more displays 2165, computer system 2100 does not necessarily require a display 2165, because all needed interaction with users and other processes may occur via network interface 2150.

Network interface 2150 is used to connect other computer systems and/or workstations (e.g., 2175 in FIG. 21) to computer system 2100 across a network 2170. The present invention applies equally no matter how computer system 2100 may be connected to other computer systems and/or workstations, regardless of whether the network connection 2170 is made using present-day analog and/or digital techniques or via some networking mechanism of the future. In addition, many different network protocols can be used to implement a network. These protocols are specialized computer programs that allow computers to communicate across network 2170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 2195 of FIG. 21), and transmission type media such as digital and analog communications links.

The preferred embodiments described herein collect more detailed profile data by allocating a frequency execution table for each loop and incrementing the count of one of the entries in the frequency execution table to indicate how many times the loop was executed for each time it is entered. This detailed profile data allows the apparatus and methods of the preferred embodiments to better optimize loops based on detailed information regarding how many times the loop was executed each time it was entered, rather than basing the decision on an estimated average, as is done in the prior art. The result is loops that are more fully optimized, resulting in a computer program that executes faster than its prior art counterparts.

Once profile data is collected into execution frequency tables as discussed above, the profile data may be used for uses other than loop peeling and unrolling. For example, the data could be used to determine whether to do loop versioning, where one version of the loop is used when the loop is executed a small number of times, and a different version is used when the loop is executed a large number of times. This may be appropriate, for example, for intense matrix processing, where a loop that is executed a large number of times may use SMP parallelization to accomplish a task more rapidly.

Another use of the profile data in an execution frequency table is to determine whether a software branch prediction should be made for the latching (return-to-top) branch when compiling for hardware that has both software and hardware branch prediction mechanisms. Typically latching branches in loops are predicted taken in software, but if the mode number of iterations is small it may be better to let the hardware predict the branch.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An apparatus comprising:
    at least one processor;
    a memory coupled to the at least one processor;
    a first instruction stream residing in the memory; and
    a profile-based loop optimizer residing in the memory and executed by the at least one processor, the loop optimizer inserting instrumentation code into the first instruction stream that collects profile data in at least one execution frequency table and thereby generating a second instruction stream, each execution frequency table indicating values representative of the number of times a corresponding loop is executed each time the loop is entered.

2. The apparatus of claim 1 wherein each execution frequency table includes a plurality of entries, each entry containing:
    (1) a value representative of the number of times a loop is executed each time the loop is entered; and (2) a count of the occurrences of each value when the second instruction stream is executed.

3. The apparatus of claim 1 wherein the profile-based loop optimizer uses values in the at least one execution frequency table to peel at least one loop in the first instruction stream.

4. The apparatus of claim 1 wherein the profile-based loop optimizer uses values in the at least one execution frequency table to unroll at least one loop in the first instruction stream.

5. The apparatus of claim 1 wherein the profile-based loop optimizer uses values in the at least one execution frequency table to peel and unroll at least one loop in the first instruction stream.

6. The apparatus of claim 1 wherein the instrumentation code comprises:
   code to allocate a loop iteration counter for a selected loop;
   code to allocate the execution frequency table for the selected loop;
   code to clear the loop iteration counter on all entry paths to the selected loop;
   code to increment the loop iteration counter in a header block for the selected loop; and
   code to read the loop iteration counter and update the execution frequency table along all exit paths from the selected loop.

7. An apparatus comprising:
   at least one processor;
   a memory coupled to the at least one processor;
   a first instruction stream residing in the memory; and
   a profile-based loop optimizer residing in the memory and executed by the at least one processor, the loop optimizer optimizing at least one loop in the first instruction stream according to profile data stored in at least one execution frequency table, each execution frequency table indicating values representative of the number of times a corresponding loop is executed each time the loop is entered.

8. The apparatus of claim 7 wherein each execution frequency table includes a plurality of entries, each entry containing:
   (1) a value representative of the number of times a loop is executed each time the loop is entered; and
   (2) a count of the occurrences of each value when the first instruction stream is executed.

9. The apparatus of claim 7 wherein the profile-based loop optimizer uses values in the at least one execution frequency table to peel at least one loop in the first instruction stream.

10. The apparatus of claim 9 wherein the profile-based loop optimizer peels a selected loop if one of the following conditions are true:
    (A) the execution frequency table for the selected loop has a dominant mode that is less than a specified peeling threshold;
    (B) the execution frequency table for the selected loop does not have a dominant mode, and a majority of the values in the execution frequency table are smaller than the specified peeling threshold.

11. The apparatus of claim 10 wherein the profile-based loop optimizer unrolls the selected loop if:
    neither (A) nor (B) are true; and
    a majority of the values in the execution frequency table for the selected loop are greater than a specified unrolling threshold.

12. The apparatus of claim 7 wherein the profile-based loop optimizer uses values in the at least one execution frequency table to unroll at least one loop in the first instruction stream.

13. The apparatus of claim 7 wherein the profile-based loop optimizer uses values in the at least one execution frequency table to peel and unroll at least one loop in the first instruction stream.

14. The apparatus of claim 7 wherein the profile-based loop optimizer determines whether to peel or unroll a loop based on a dominant mode, if present, in the execution frequency table corresponding to the loop.

15. An apparatus comprising:
    (A) at least one processor;
    (B) a memory coupled to the at least one processor;
    (C) a first instruction stream residing in the memory; and
    (D) a profile-based loop optimizer residing in the memory and executed by the at least one processor, the loop optimizer inserting instrumentation code into the first instruction stream that collects profile data in at least one execution frequency table and thereby generating a second instruction stream, wherein each execution frequency table includes a plurality of entries, each entry containing:
        (D1) a value representative of the number of times a loop is executed each time the loop is entered; and
        (D2) a count of the occurrences of each value when the second instruction stream is executed;
    (E) wherein the instrumentation code comprises:
        (E1) code to allocate a loop iteration counter for a selected loop;
        (E2) code to allocate the execution frequency table for the selected loop;
        (E3) code to clear the loop iteration counter on all entry paths to the selected loop;
        (E4) code to increment the loop iteration counter in a header block for the selected loop; and
        (E5) code to read the loop iteration counter and update the execution frequency table along all exit paths from the selected loop;
    (F) the loop optimizer optimizing a loop in the first instruction stream according to profile data stored in the at least one execution frequency table by peeling the loop, unrolling the loop, or both peeling and unrolling the loop based on profile data stored in the execution frequency table corresponding to the loop.

16. The apparatus of claim 15 wherein the profile-based loop optimizer peels a selected loop if one of the following conditions are true:
    (A) the execution frequency table for the selected loop has a dominant mode that is less than a specified peeling threshold;
    (B) the execution frequency table for the selected loop does not have a dominant mode, and a majority of the values in the execution frequency table are smaller than the specified peeling threshold.

17. The apparatus of claim 16 wherein the profile-based loop optimizer unrolls the selected loop if:
    neither (A) nor (B) are true; and
    a majority of the values in the execution frequency table for the selected loop are greater than a specified unrolling threshold.

18. A method for instrumenting a first instruction stream comprising the steps of:
    inserting code into the first instruction stream for a selected loop that defines at least one execution frequency table for the selected loop, each execution frequency table indicating values representative of the number of times the selected loop is executed each time the selected loop is entered;
    inserting code into the first instruction stream that updates the execution frequency table according to the number of times the selected loop is executed each time the loop is entered.

19. A method for instrumenting a first instruction stream comprising the steps of:
- inserting code that allocates a loop iteration counter for a selected loop in the first instruction stream;
- inserting code that allocates an execution frequency table that corresponds to the selected loop; and
- inserting code to clear the loop iteration counter on all entry paths to the selected loop;
- inserting code to increment the loop iteration counter in a header block for the selected loop; and
- inserting code to read the loop iteration counter and update the execution frequency table along all exit paths from the selected loop according to the number of times the selected loop is executed each time the loop is entered.

20. A method for optimizing at least one loop in a first instruction stream, the method comprising the steps of:
- inserting instrumentation code into the first instruction stream that collects profile data in at least one execution frequency table and thereby generating a second instruction stream, each execution frequency table indicating values representative of the number of times a corresponding loop is executed each time the loop is entered; and
- optimizing at least one loop in the first instruction stream according to profile data stored in at least one execution frequency table.

21. The method of claim 20 wherein each execution frequency table includes a plurality of entries, each entry containing:
(1) a value representative of the number of times a loop is executed each time the loop is entered; and
(2) a count of the occurrences of each value when the first instruction stream is executed.

22. The method of claim 20 further comprising the step of using values in the at least one execution frequency table to peel at least one loop in the first instruction stream.

23. The method of claim 20 wherein the step of using values in the at least one execution frequency table to peel at least one loop in the first instruction stream peels a selected loop if one of the following conditions are true:
(A) the execution frequency table for the selected loop has a dominant mode that is less than a specified peeling threshold;
(B) the execution frequency table for the selected loop does not have a dominant mode, and a majority of the values in the execution frequency table are smaller than the specified peeling threshold.

24. The method of claim 23 further comprising the step of unrolling the selected loop if:
neither (A) nor (B) are true; and
a majority of the values in the execution frequency table for the selected loop are greater than a specified unrolling threshold.

25. The method of claim 20 further comprising the step of using values in the at least one execution frequency table to unroll at least one loop in the first instruction stream.

26. The method of claim 20 further comprising the step of using values in the at least one execution frequency table to peel and unroll at least one loop in the first instruction stream.

27. The method of claim 20 further comprising the step of determining whether to peel or unroll a loop based on a dominant mode, if present, in the execution frequency table corresponding to the loop.

28. A method for optimizing a plurality of loops in a first instruction stream, the method comprising the steps of:
(A) inserting code that allocates a loop iteration counter for at least one loop in the first instruction stream;
(B) inserting code that allocates an execution frequency table that corresponds to a loop in the first instruction stream, wherein each execution frequency table includes a plurality of entries, each entry containing:
(1) a value representative of the number of times a loop is executed each time the loop is entered; and
(2) a count of the occurrences of each value;
(C) inserting code to clear the loop iteration counter on all entry paths to the selected loop;
(D) inserting code to increment the loop iteration counter in a header block for the selected loop; and
(E) inserting code to read the loop iteration counter and update the execution frequency table along all exit paths from the selected loop according to the number of times the selected loop is executed each time the loop is entered;
(F) the inserting code in steps (A) through (E) generating a second instruction stream;
(G) executing the second instruction stream with sample inputs to collect profile data in the at least one execution frequency table;
(H) using values in the at least one execution frequency table to peel at least one loop in the first instruction stream based on profile data stored in the execution frequency table corresponding to the loop; and
(I) using values in the at least one execution frequency table to unroll at least one loop in the first instruction stream based profile data stored in the execution frequency table corresponding to the loop.

29. The method of claim 28 wherein the step of using values in the at least one execution frequency table to peel at least one loop in the first instruction stream peels a selected loop if one of the following conditions are true:
(A) the execution frequency table for the selected loop has a dominant mode that is less than a specified peeling threshold;
(B) the execution frequency table for the selected loop does not have a dominant mode, and a majority of the values in the execution frequency table are smaller than the specified peeling threshold.

30. The method of claim 29 wherein the step of using values in the at least one execution frequency table to unroll at least one loop in the first instruction stream unrolls the selected loop if:
neither (A) nor (B) are true; and
a majority of values in the execution frequency table for the selected loop are greater than a specified unrolling threshold.

31. A program product comprising:
(A) a profile-based loop optimizer that inserts instrumentation code into a first instruction stream that collects profile data in at least one execution frequency table and thereby generates a second instruction stream, each execution frequency table indicating values representative of the number of times a corresponding loop is executed each time the loop is entered; and
(B) computer-readable signal bearing media bearing the profile-based loop optimizer.

32. The program product of claim 31 wherein the computer-readable signal bearing media comprises recordable media.

33. The program product of claim 31 wherein the computer-readable signal bearing media comprises transmission media.

34. The program product of claim 31 wherein each execution frequency table includes a plurality of entries, each entry containing:
(1) a value representative of the number of times a loop is executed each time the loop is entered; and (2) a count of the occurrences of each value when the second instruction stream is executed.

35. The program product of claim 31 wherein the profile-based loop optimizer uses values in the at least one execution frequency table to peel at least one loop in the first instruction stream.

36. The program product of claim 31 wherein the profile-based loop optimizer uses values in the at least one execution frequency table to unroll at least one loop in the first instruction stream.

37. The program product of claim 31 wherein the profile-based loop optimizer uses values in the at least one execution frequency table to peel and unroll at least one loop in the first instruction stream.

38. The program product of claim 31 wherein the instrumentation code comprises:
    code to allocate a loop iteration counter for a selected loop;
    code to allocate the execution frequency table for the selected loop;
    code to clear the loop iteration counter on all entry paths to the selected loop;
    code to increment the loop iteration counter in a header block for the selected loop; and
    code to read the loop iteration counter and update the execution frequency table along all exit paths from the selected loop.

39. A program product comprising:
    (A) a profile-based loop optimizer that optimizes at least one loop in a first instruction stream according to profile data stored in at least one execution frequency table, each execution frequency table indicating values representative of the number of times a corresponding loop is executed each time the loop is entered; and
    (B) computer-readable signal bearing media bearing the profile-based loop optimizer.

40. The program product of claim 39 wherein the computer-readable signal bearing media comprises recordable media.

41. The program product of claim 39 wherein the computer-readable signal bearing media comprises transmission media.

42. The program product of claim 39 wherein each execution frequency table includes a plurality of entries, each entry containing:
    (1) a value representative of the number of times a loop is executed each time the loop is entered; and
    (2) a count of the occurrences of each value when the first instruction stream is executed.

43. The program product of claim 39 wherein the profile-based loop optimizer uses values in the at least one execution frequency table to peel at least one loop in the first instruction stream.

44. The program product of claim 39 wherein the profile-based loop optimizer peels a selected loop if one of the following conditions are true:
    (A) the execution frequency table for the selected loop has a dominant mode that is less than a specified peeling threshold;
    (B) the execution frequency table for the selected loop does not have a dominant mode, and a majority of the values in the execution frequency table are smaller than the specified peeling threshold.

45. The program product of claim 44 wherein the profile-based loop optimizer unrolls the selected loop if:
    neither (A) nor (B) are true; and
    a majority of the values in the execution frequency table for the selected loop are greater than a specified unrolling threshold.

46. The program product of claim 39 wherein the profile-based loop optimizer uses values in the at least one execution frequency table to unroll at least one loop in the first instruction stream.

47. The program product of claim 39 wherein the profile-based loop optimizer uses values in the at least one execution frequency table to peel and unroll at least one loop in the first instruction stream.

48. The program product of claim 39 wherein the profile-based loop optimizer determines whether to peel or unroll a loop based on a dominant mode, if present, in the execution frequency table corresponding to the loop.

49. A program product comprising:
    (A) a profile-based loop optimizer that inserts instrumentation code into a first instruction stream that collects profile data in at least one execution frequency table and thereby generating a second instruction stream, wherein each execution frequency table includes a plurality of entries, each entry containing:
        a value representative of the number of times a loop is executed each time the loop is entered; and
        a count of the occurrences of each value when the second instruction stream is executed;
    wherein the instrumentation code comprises:
        code to allocate a loop iteration counter for a selected loop;
        code to allocate the execution frequency table for the selected loop;
        code to clear the loop iteration counter on all entry paths to the selected loop;
        code to increment the loop iteration counter in a header block for the selected loop; and
        code to read the loop iteration counter and update the execution frequency table along all exit paths from the selected loop;
    the loop optimizer optimizing a loop in the first instruction stream according to profile data stored in the at least one execution frequency table by peeling the loop, unrolling the loop, or both peeling and unrolling the loop based on profile data stored in the execution frequency table corresponding to the loop; and
    (B) computer-readable signal bearing media bearing the profile-based loop optimizer.

50. The program product of claim 49 wherein the computer-readable signal bearing media comprises recordable media.

51. The program product of claim 49 wherein the computer-readable signal bearing media comprises transmission media.

52. The program product of claim 49 wherein the profile-based loop optimizer peels a selected loop if one of the following conditions are true:
    (A) the execution frequency table for the selected loop has a dominant mode that is less than a specified peeling threshold;
    (B) the execution frequency table for the selected loop does not have a dominant mode, and a majority of the values in the execution frequency table are smaller than the specified peeling threshold.

53. The program product of claim 52 wherein the profile-based loop optimizer unrolls the selected loop if:
    neither (A) nor (B) are true; and
    a majority of the values in the execution frequency table for the selected loop are greater than a specified unrolling threshold.

* * * * *